US011763345B2

(12) United States Patent
Hicken et al.

(10) Patent No.: US 11,763,345 B2
(45) Date of Patent: *Sep. 19, 2023

(54) METHOD AND SYSTEM FOR SELECTING TARGETED ADVERTISEMENTS AND PRESENTING TO USERS INTERACTING WITH AN ONLINE WEBSITE

(71) Applicant: THRYV, INC., D/FW Airport, TX (US)

(72) Inventors: Wendell Hicken, La Verne, CA (US); Joshua Melick, Oakland, CA (US)

(73) Assignee: Thryv, Inc., D/FW Airport, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,200

(22) Filed: Feb. 8, 2022

(65) Prior Publication Data

US 2022/0164828 A1  May 26, 2022

Related U.S. Application Data

(63) Continuation-in-part of application No. 16/571,978, filed on Sep. 16, 2019, now abandoned, which is a continuation of application No. 12/952,975, filed on Nov. 23, 2010, now Pat. No. 10,417,660.

(51) Int. Cl.
*G06Q 30/00* (2023.01)
*G06Q 30/0251* (2023.01)

(52) U.S. Cl.
CPC ..... *G06Q 30/0255* (2013.01); *G06Q 30/0256* (2013.01); *G06Q 30/0261* (2013.01); *G06Q 30/0269* (2013.01)

(58) Field of Classification Search
CPC .......... G06Q 30/0255; G06Q 30/0256; G06Q 30/0261; G06Q 30/0269
See application file for complete search history.

(56) References Cited

U.S. PATENT DOCUMENTS

| 5,930,474 | A  | 7/1999 | Dunworth |
| 6,532,023 | B1 | 3/2003 | Schumacher et al. |
| 7,343,328 | B1 | 3/2008 | Smith |
| 8,781,105 | B1 | 7/2014 | Duva et al. |
| 10,417,660 | B2 | 9/2019 | Hicken et al. |
| 2002/0049635 | A1 | 4/2002 | Mai et al. |

(Continued)

OTHER PUBLICATIONS

"Internet Advertising: An Interplay among Advertisers, Online Publishers, Ad Exchanges and Web Users" Shuai Yuan et. al., Department of Computer Science, University College London; Jul. 4, 2012. (Year: 2012).*

(Continued)

*Primary Examiner* — Yehdega Retta
(74) *Attorney, Agent, or Firm* — GREENSFELDER, HEMKER & GALE, P.C.; Mark E. Stallion

(57) ABSTRACT

A data processing system collects messages to create user profiles for users of user devices. The messages are collected from various systems and include data regarding user events on user devices in order to create user profiles. The user profiles are stored. In response to a request for information corresponding to a user device, a user profile is identified using data from the request and information from the profile is provided to the requester. A method and system is utilized to select and provide targeted advertisements.

17 Claims, 11 Drawing Sheets

(56) References Cited

U.S. PATENT DOCUMENTS

| | | |
|---|---|---|
| 2002/0123987 A1 | 9/2002 | Prakash |
| 2004/0073693 A1 | 4/2004 | Slater |
| 2005/0055337 A1 | 3/2005 | Bebo et al. |
| 2006/0020510 A1 | 1/2006 | Vest |
| 2006/0242017 A1 | 10/2006 | Libes et al. |
| 2006/0277108 A1 | 12/2006 | Altberg et al. |
| 2007/0100834 A1 | 5/2007 | Landry et al. |
| 2007/0162334 A1 | 7/2007 | Altberg et al. |
| 2007/0233577 A1 | 10/2007 | Glass |
| 2008/0059298 A1 | 3/2008 | Waag et al. |
| 2008/0104201 A1 | 5/2008 | Moon et al. |
| 2008/0294596 A1 | 11/2008 | Xiong |
| 2009/0006190 A1 | 1/2009 | Lucash et al. |
| 2009/0144068 A1 | 6/2009 | Altberg et al. |
| 2009/0187459 A1 | 7/2009 | Hayes, Jr. et al. |
| 2009/0187659 A1 | 7/2009 | Savoure |
| 2009/0247193 A1 | 10/2009 | Kalavade |
| 2009/0299831 A1 | 12/2009 | Li et al. |
| 2010/0093441 A1 | 4/2010 | Rajaraman et al. |
| 2010/0185507 A1 | 7/2010 | Tokuda |
| 2011/0055194 A1 | 3/2011 | Ghosh |
| 2011/0196733 A1 | 8/2011 | Li et al. |
| 2011/0197633 A1 | 8/2011 | Tomamato et al. |
| 2011/0213741 A1 | 9/2011 | Shama et al. |
| 2011/0275047 A1 | 11/2011 | Gomes et al. |
| 2011/0295628 A1 | 12/2011 | Priyadarshan et al. |
| 2012/0078742 A1 | 3/2012 | Oleen |
| 2012/0078938 A1 | 3/2012 | Davis et al. |
| 2012/0116872 A1 | 5/2012 | Hicken et al. |
| 2012/0179568 A1 | 7/2012 | Soroca et al. |
| 2013/0124259 A1 | 5/2013 | Chourey et al. |
| 2013/0129060 A1 | 5/2013 | Gopalakrishnan et al. |
| 2013/0254035 A1 | 9/2013 | Ramer et al. |
| 2013/0297442 A1 | 11/2013 | Simons et al. |
| 2014/0012678 A1 | 1/2014 | Hayes, Jr. |
| 2014/0222551 A1 | 8/2014 | Jain et al. |
| 2020/0013086 A1 | 1/2020 | Hicken |

OTHER PUBLICATIONS

"iQueue: A Pervasive Data Composition Framework", Norman H. Cohen, et. al. IBM Thomas J. Watson Research Center, Hawthorne, New York, USA; 2002. (Year: 2002).*

A Banner Recommendation System Based on Web Navigation History Giovanni Giuffrida, IEEE; 2011. (Year: 2011).*

Berry "Data Mining Techniques: For Marketing, Sales and Customer Relationships" 2004.

* cited by examiner

302

Web  Images  Videos  Shopping  News  Maps  More  |  MSN  |  Windows Live
bing restaurants san francisco, CA 🔍
ALL RESULTS   Businesses   Not What you Wanted?   Sort by: Best match | Distance | Rating Local RELATED CATEGORY
Restaurants (9181)
American & Ca...(1377)
Taverns, Bars... (1123)
Bars, Grills &&... (755)
European Resta...(685)
Italian Restau...(353)
Banquet Facili...(295)
United States...(193)

⊞ RATING (MINIMUM)
⊞ PRICE (MAXIMUM)
⊞ CUISINE
⊞ ATMOSPHERE
⊞ RESERVATIONS
⊞ PAYMENT
⊞ PARKING

306 ↗

304

SPONSORED LISTINGS FROM YELLOWPAGES.COM
Ⓐ Scoma's Fisherman's Wharf
   Pier 43 1/2, San Francisco, CA = 2.09 mi
   (415) 771-4383  Website
   1-click directions Bella Vista Restaurant
   13451 Skyline Blvd, Redwood City, CA    ⎫
   (650) 529-4316  Website                ⎬ 308
   1-click  Watch Video                   ⎭

Ⓑ North Beach Restaurant
   1512 Stockton St. San Francisco, CA = 1.54 mi
   (415) 392-1700  Website
   1-click directions ALL LISTINGS
① Ducca Restaurant & Lounge
   50 3rd St. San Francisco CA = 1.09mi
   (415)977-0271 Website
   Cuisine: Italian Neighborhood: Financial District South
   Price:$$$$ Parking: Valet parking, Parking on site, Paid parking on site
   Hours: Daily 6:30 am–10:30am, 11:30–12:30am
   ★★★★★  280 Reviews  1-click directions   Bird's eye ② Castagnola's Restaurant
   286 Jefferson ST, San Francisco, CA = 2.00mi
   (415)776-5015 Website
   Cuisine: Italian, Seafood   Neighborhood: Fisherman's Wharf
   Price:$$ Parking: Parking on site, Street parking, Paid parking on site
   Hours: Daily 11am–10pm
   ★★★★★  280 Reviews  1-click directions   Bird's eye

FIGURE 3

METHOD AND SYSTEM FOR SELECTING TARGETED ADVERTISEMENTS AND PRESENTING TO USERS INTERACTING WITH AN ONLINE WEBSITE

CROSS REFERENCE

This application is a continuation-in-part of U.S. patent application Ser. No. 16/571,978 entitled SELECTING ADVERTISEMENTS FOR USERS VIA A TARGETING DATABASE, filed on Sep. 16, 2019 (now abandoned), which is a continuation of U.S. Pat. No. 10,417,660, (Ser. No. 12/952,975) entitled SELECTING ADVERTISEMENTS FOR USERS VIA A TARGETING DATABASE, filed on Nov. 23, 2010, whereby the contents of both referenced priority applications are incorporated herein by reference in their entirety.

BACKGROUND

Field of Technology

At least some embodiments disclosed herein relate to user targeting systems in general, and more particularly, but not limited to, creating user profiles for users and providing information about a user from a selected user profile in response to a request for user information.

Background

The Internet, cellular communication systems, television, newspaper, etc., provide diverse communication media channels through which people may receive information and/or communicate with one another.

For example, people may use a website to chronologically publish personal thoughts and web links. Such a website may be referred to as a blog. Another website may be used to search for information (e.g., Google's search website). Yet other websites may be used for interacting with online social networks (e.g., Facebook's social website).

When a user interacts with one of the foregoing websites, or others, using a user terminal or user device (e.g., a laptop computer or an iPhone telecommunication device), advertisements (sometimes referred to herein as simply "ads") are often presented for display to the user. These ads are sometimes presented in response to a user request (e.g., a search request), and in other cases are presented even without any particular request or action by the user (e.g., an ad presented when a webpage is first loaded onto a user's device).

Advertisements may also be presented to users (e.g., potential customers) that communicate using other forms of media. In addition to websites, users may receive information and communicate, for example, via cellular phones or other mobile devices, television or video devices, and even through traditional print media (e.g., where the user is a reader of the print media, and then later takes an action online using information found in the print media).

Publishers of the various foregoing forms of media often make decisions to select particular ads for particular users or readers. A publisher usually selects ads that will be most effective for attracting business from the user to the service or product provider that has sponsored an advertisement accompanying or presented during the user's interaction on or with the media.

BRIEF DESCRIPTION OF THE DRAWINGS

The embodiments are illustrated by way of example and not limitation in the figures of the accompanying drawings in which like references indicate similar elements.

FIG. 3 shows an example of a web page having advertisements according to one embodiment.

DETAILED DESCRIPTION

Figure 1:
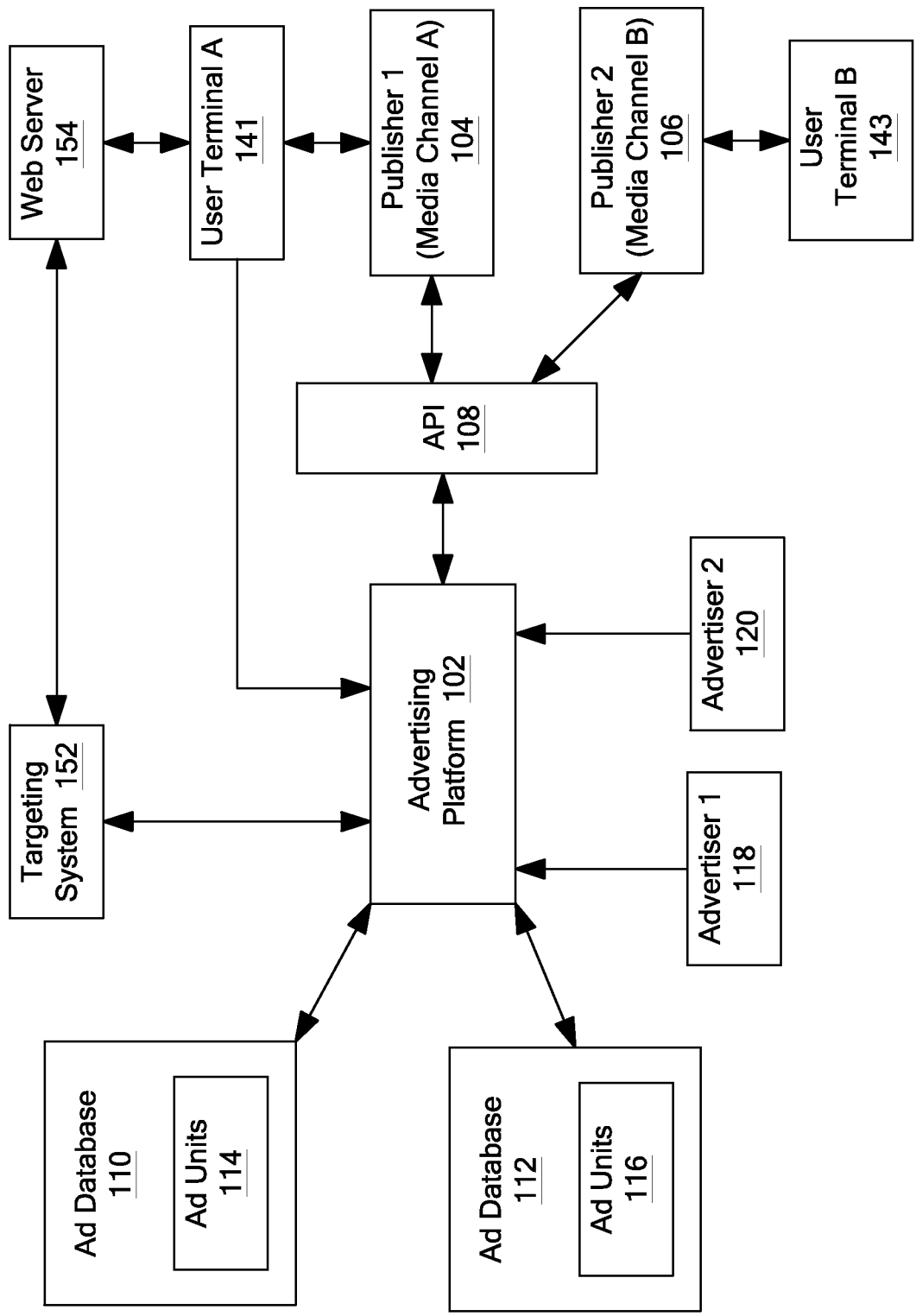
FIG. 1 shows a system for selecting an advertisement using an advertising platform and presenting the advertisement to a user according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

As used herein a "pay-per-call advertisement" is an advertisement for which some form of compensation is provided on a per call basis (e.g., a payment by a service provider for each call made to the service provider in response to an online advertisement seen by a user on a user terminal). For example, the compensation may be in the form of a cash payment or credit (e.g., made online via a computer system). Examples of pay-per-call advertisements and systems therefor are described in U.S. Patent Application Publication No. 2007/0162334, published Jul. 12, 2007 (titled "SYSTEMS AND METHODS TO CONVERT A CALL GENERATED FROM AN ADVERTISEMENT" by Altberg et al.), which is hereby incorporated by reference in its entirety.

Systems and methods to create user profiles for users and provide information about a user from a selected user profile (e.g., stored in a database) in response to a request for user information are described below. In one embodiment, a method implemented in a data processing system includes: receiving, via a data processing system, a plurality of messages including a first message, each message of the plurality of messages being sent from a respective server of a plurality of servers, and the first message including first user event data; creating a plurality of user profiles from information in the plurality of messages, the plurality of user profiles including a first user profile comprising information from the first user event data; storing, via the data processing system, the plurality of user profiles in a database; receiving a request corresponding to a user device; and identifying the first user profile using data from the request.

In one embodiment, the method further comprises sending, in response to the request, data from the first user profile. In another embodiment, the method further comprises using the data from the first user profile to select a category from a plurality of categories, where each respective category corresponds to a set of advertisements; and selecting an advertisement corresponding to the category for display on the user device. In one embodiment, the first user profile includes search data from a plurality of prior search requests of a first user (e.g., as input on a laptop when searching on the GOOGLE website), and the search data is obtained from at least two of the plurality of messages.

In one embodiment, the request is an advertisement request, and the method further comprises using data from the first user profile to select an advertisement, and sending the advertisement for display on the user device. In one embodiment, the data from the first user profile comprises user context and location data, and the using data to select the advertisement comprises selecting the advertisement (to respond to the advertisement request) using the user context and location data. In one embodiment, the respective server is a search engine server, and the first user event data includes search terms submitted by a first user.

In one embodiment, the plurality of messages are received via a listener process of the data processing system, and the method further comprises queuing at least two of the plurality of messages in a message queue. In one embodiment, the method further comprises pulling messages from the message queue, and storing information from the messages to create or update user profiles in the database.

In one embodiment, each of the plurality of messages includes an event corresponding to a user device, and each of the plurality of messages is sent from its respective server by user datagram protocol (UDP) broadcasting.

In one embodiment, the user device is a mobile device (e.g., a mobile phone), and the request includes a user identifier. In some embodiments, the user identifier is a subscriber identifier corresponding to the mobile device, and the identifying comprises using the subscriber identifier to identify the first user profile. In other embodiments, the user identifier is an identifier of the mobile phone itself, or is an arbitrarily-assigned identifier that is associated with the request.

In one embodiment, the database comprises a relational database and a real-time database, and the plurality of user profiles are stored in the relational database and at least a portion of data from the first user profile (and other user profiles) is stored in the real-time database.

In one embodiment, the method further comprises receiving data from a first server, the data corresponding to user information collected by the first server; and updating the plurality of user profiles, including the first user profile, in the database using the data from the first server.

In addition, systems and methods to select one or more advertisements from one or more databases for sending at least one advertisement (e.g., as a set of advertisement units) to a publisher (e.g., through an application programming interface accessed by a computer server of the publisher) are described below. In one embodiment, a method implemented in a data processing system includes: determining a user context; retrieving, via the data processing system, candidate advertisements from at least one advertisement database to create an advertisement candidate pool, the retrieving based on the user context; selecting, via the data processing system, a set of advertisements from the advertisement candidate pool; and sending the set of advertisements.

The determining the user context may include identifying a user as belonging to a demographic category (e.g., a young mother), and the retrieving may be based on the demographic category (e.g., selecting advertisements for baby products or services). In one example, the set of advertisements are provided in reply to an ad request (also referred to sometimes as a specific ad call). The ad request may include a search term, location, and a number of ads requested. The location may be the user location, or may be another location provided by the publisher for other business reasons or goals.

In one embodiment, the determining the user context comprises receiving a first advertisement request comprising user search data corresponding to a search request of a user, where the user search data includes a search term. The retrieving is based on the search term, and the sending of the set of advertisements is in reply to the first advertisement request. In one embodiment, the user search data further includes a search location, and the retrieving is further based on the search location.

In one embodiment, the method further comprises logging performance data regarding user interactions with the set of advertisements, and adding the performance data to an historical performance database. The retrieving is performed further based on the data in the historical performance database (e.g., to improve advertisement effectiveness based on feedback from actual user purchases or contacts with advertisers). The method may include providing an annotation to each advertisement in the set of advertisements for use in tracking each respective advertisement, and receiving tracking data corresponding to each respective advertisement.

In one embodiment, the selecting of the set of advertisements comprises scoring advertisements in the advertisement candidate pool according to a ranking function. In one embodiment, the selecting the set of advertisements comprises selecting the set of advertisements using weighted advertisement rotation. In one embodiment, the selecting the set of advertisements comprises sorting advertisements in the advertisement candidate pool into at least a first bucket and a second bucket, and the selecting further comprises associating the first bucket with a higher advertisement selection priority than the second bucket.

In one embodiment, the at least one advertisement database comprises a first database and a second database, the first database storing subscription advertisements and the second database storing pay-per-call advertisements. The first advertisement request may be a request for a subscription advertisement from a first publisher. The method may further comprise receiving a second advertisement request for a pay-per-call advertisement from a second publisher, wherein the first and second requests are received using a common application programming interface (API) supported by the data processing system. This is in contrast to prior systems that use multiple APIs, one for each type of advertisement desired by a publisher.

In one embodiment, the sending the set of advertisements comprises sending the set of advertisements to a publisher, and the method further comprises eliminating advertisement candidates from consideration for the advertisement candidate pool that are not in compliance with business rules provided by the publisher prior to the retrieving. For example, a particular publisher may require that no adult product advertisements, or advertisements from particular competitors, be sent to the publisher.

In one embodiment, the method may further comprise receiving, via the data processing system, advertisements from an advertiser, and storing the advertisements from the advertiser in the at least one database. The first advertisement request is received through an application programming interface, and the advertisements from the advertiser are received, via a data processing system (e.g., a web server) of the publisher, through the application programming interface.

In another system embodiment, a data processing system includes memory (e.g., hard drives or flash memory) storing at least one advertisement database (e.g., two or more databases, each storing a particular format or type of advertisement record). The data processing system includes at least one processor coupled to access the memory (e.g. via local addressing, a local area network, or via a link over the Internet). The at least one processor is configured to determine a user context; retrieve candidate advertisements from the at least one advertisement database in order to create an advertisement candidate pool, the retrieving based on the user context; select a set of advertisements from the advertisement candidate pool; and send the set of advertisements.

The disclosure below includes various methods and apparatuses which perform the above methods, including data processing systems which perform these methods, and computer-readable media containing instructions which when executed on data processing systems cause the systems to perform these methods. Other features will be apparent from the accompanying drawings and from the detailed description which follows.

FIG. 1 shows a system 101 for selecting one or more advertisements using an advertising platform 102 and presenting the advertisement(s) to a user (e.g., via a social media publisher's website) according to one embodiment. Publishers 104, 106 each may access advertising platform 102 via an application programming interface (API) 108. Publishers 104, 106 may send requests for advertisements to platform 102. These requests may relate in this embodiment to user requests by users operating user terminals 141, 143, in which one of the users makes a search request to a server of publisher 104 or 106. One example of a user request is a search request by a user seeking information about a particular topic (e.g., the user enters a text search term into an input device of a user terminal, which search term is sent by the publisher to advertising platform 102).

In response to the ad request sent to platform 102, one or more databases 110, 116 are queried in order to retrieve ads that may be suitable for responding to the ad request. Each database 110, 116 may store ad units 114, 116. Alternatively, only a portion of an ad unit may be stored in database 110, 116, and the ad units 114, 116 may be finally assembled by platform 102 just before sending to publishers 104, 106. In one example, database 110 stores pay-percall advertisements, and database 112 stores subscription advertisements.

In one embodiment, database 116 stores a list of ads for each category/geographic combination associated with ad requests. This database provides, for example, candidate subscription ads for the advertising candidate pool 210 (see FIG. 2) discussed in more detail below. The user search data received from a publisher in an ad request includes a search location of a user on a user terminal. These ads are retrieved from the database at least in part based on this search location. The ad request also further includes the number of ads desired by the publisher.

The advertisements stored in databases 110, 116 may be provided from advertisers 118, 120. Advertisers 118, 120 may access platform 102 directly (e.g., via an API), or publishers 104, 106 may accept desired ads from advertisers 118, 120, and then publishers 104, 106 may provide the ads to platform 102 on behalf of advertisers 118, 120. Ads may also be provided from other sources.

In reply to the ad request, selected advertisements (e.g., in the form of ad units 114, 116) are sent to the requesting publisher 104 or 106. The selected ads are assembled by publishers 104, 106 into, for example, a web page that will be provided to a user in response to a user search request.

In general, publishers 104, 106 may maintain media channels of many various types including websites selling products or services, or social network websites, mobile media, cable and satellite television, video distribution, and print (e.g., newspapers and magazines). Advertising platform 102 may select advertisements from databases 114, 116 that are most appropriate for the media type of a publisher.

The advertisements sent to a publisher may correspond to various types of ad products including, for example, pay-per-call ads, presence ads, cost per click, or cost per impression. In one embodiment, advertising platform 102 is able to serve ad products (e.g., display ads, Internet Yellow Pages subscription ads, pay-per-call ads, cost-per-click/impression products) in different types of medium (e.g., print, web, mobile, video, television, and social) across multiple platforms (e.g., vendors, publishers, YP.com, and pay-per-call ads).

In other embodiments, a targeting system 152 stores user profiles in a targeting database (illustrated and discussed with respect to FIGS. 10a and 10b below). Advertisement platform 102 may make a request to targeting system 152 for information regarding a user for which an advertisement(s) is to be selected and sent for viewing. The response to the request may provide user context and location information that has been retrieved from the targeting database, as discussed further below.

In one embodiment, the targeting database is created and updated based on information in messages received from numerous servers and data processing systems with which users interact (e.g., the user of user terminal 141 may interact with web server 154 in various ways such as playing a role-playing game, searching for information, etc.). These messages are sent to targeting system 152, and information from the messages is extracted or derived for storage in the targeting database. The creation of the database and the providing of user information in response to requests are discussed in more detail below.

In one embodiment, targeting system 152 is a system configured to monitor user activity and generate information about those users, which can be leveraged to improve advertiser opportunities. Data may be collected from many disparate sources using technology pipelines for each source. For example, large collections of customer data may be imported via a batch process, and live user behavior can be tracked using real-time events obtained from data center operations. Once the information is collected, it can be processed and analyzed to create user profiles describing key information about each user, including but not limited to key areas of interest and demographic data. Targeting system 152 may be architected to protect user privacy while still allowing dependent systems sufficient information to make informed decisions about selecting and showing different types of advertising products.

In one embodiment, targeting system 152 provides more control over which ads to show the users. It implements the use of smart ads that are able to take into account the user's interest. By creating user profiles (discussed in more detail below), ads can be sorted to show users ads that are of increased interest and related to what the user is searching.

The targeting system 152 permits improvement of click-through rates by providing more information about a user's demographic background and past behavior. By delivering more targeted ads, the user engagement rate typically increases (e.g., to include pay-per-call events or other billable events). Users will be able to see ads for related products or services for their searches, which provides more value to the users by making the user experience more meaningful. Further, targeting system 152 provides intelligent methods to select categories in the absence of search terms, contributing to the optimization of display ads. Increased click and call-through rates increase value to advertisers.

Figure 2:
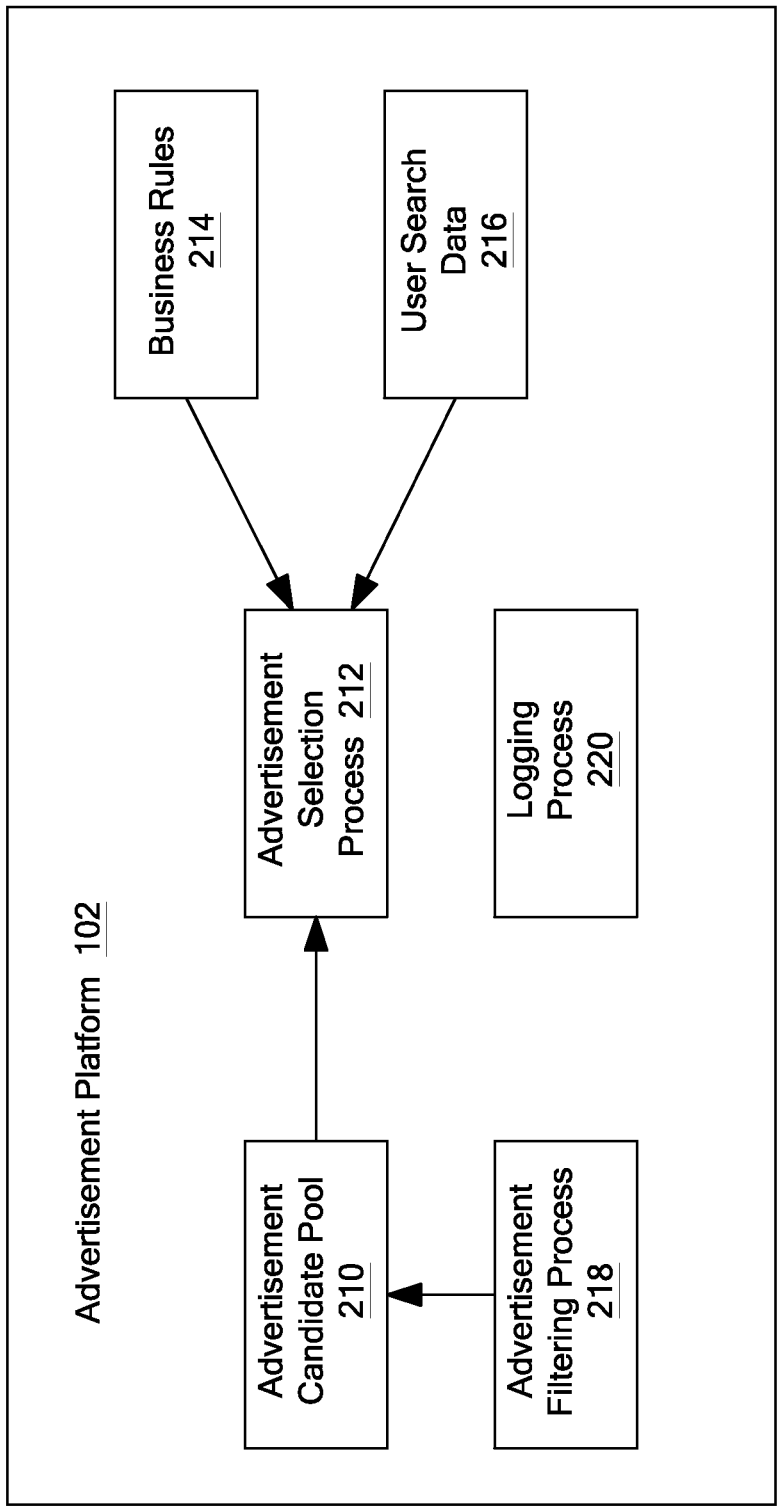
FIG. 2 shows the structure of an advertising platform according to one embodiment.

FIG. 2 shows the structure of advertising platform 102 according to specific one embodiment. Ads retrieved from databases 110 and 112 are assembled into an initial candidate pool 210. These are ads that are expected to be eligible for use with the ad request from publisher 104, 106.

An advertisement filtering process 218 runs on platform 102, and may use logic stored on platform 102 to narrow or reduce the size of the initial candidate pool. For example, filtering process 218 may narrow the pool based on particular configuration requests or characteristics of a given publisher. The narrowed ad pool thereby provides a set of ad listings that will be the final candidate pool from which ads are selected for sending to a requesting publisher 104, 106.

An advertisement selection process 212 runs on platform 102 and is applied to the final candidate pool that was obtained from the filtering process 218 above. In one embodiment, selection process 212 sorts and rotates candidate ads in candidate pool 210 with varying algorithms. This sorting, rotation, and particular algorithms may be configured for each particular publisher that interacts with platform 102.

Selection process 212 may use user search data 216, which is obtained from a publisher based on a search request from a user, to customize the particular ads that will be sent to a publisher. Also, business rules 214 may be used by selection process 212 in order to determine an ordering or priority with which ads will be sent from candidate pool 210 to a publisher. These business rules 214 may be provided by a publisher, for example, when configuring an account for the publisher with advertising platform 102, and also may be periodically updated by the publisher. Business rules 214 may place restrictions on the types or categories of ads that may be sent to a publisher in response to ad requests.

In one embodiment, advertisement selection process 212 chooses which, if any, of the available ads in candidate pool 210 should be shown for a given ad request. The considerations may include relevance (e.g., what is the applicable user looking for or interested in), as well as business rules 214 (e.g., rules related to the amount paid by a certain advertiser for the showing of its ads).

In this embodiment, when a large ad pool 210 is present, the pool 210 is narrowed down to minimize the amount of processing required by platform 210. In some embodiments, all of the candidate ads are scored according to some ranking function, the list of all ads is sorted by that score, and then ads are selected from the top of this list as needed to satisfy an ad request. In some embodiments, further details may be used to narrow the list of ads, including eliminating ads that have already been shown to the specific user associated with the ad request.

An example of a scoring algorithm is one based on the cost that the advertiser is willing to pay for advertisements. The advertisers that pay the highest amount will have their ads appear most often. For a cost-per-impression (CPM) ad product, this is readily implemented. For a performance product (e.g., a pay-per-click advertising model, etc.), the business value depends on the likelihood that the user will click on the ad, multiplied by the revenue value of the click. In such a scenario, identifying ads that the user is most likely to click may be a key part of the scoring function. As platform 102 is better able to predict click-through rates, the more readily platform 102 can optimize ad impressions to increase revenue.

A logging process 220 may also run on platform 102. Performance data may be received and logged that indicates and records (in historical data records for future reference) the manner in which a user interacts with the advertisements that were sent to the publisher (and that are ultimately viewed by the user). This data may be added to an historical performance database stored at or accessible by platform 102. The retrieving of ads from databases 110, 112 may further be based on the data in the historical performance database. An annotation may be provided on each advertisement in the set of advertisements sent to the publisher for use in tracking each advertisement. The tracking data corresponding to each advertisement may be received directly by advertising platform 102 or via data from a publisher.

As examples of tracking and logging, tracking data may be provided to platform 102 in call-backs from a publisher's server (e.g., including information about which ads the publisher decided to show to users), or in call-backs from an end user's Internet browser (e.g., when a tracking pixel is rendered on a display of the user terminal, or when the user clicks on a link having a click wrapper, the user's request is routed through a server of platform 102 before being forwarded to its final destination so that platform 102 is able to count and log the click).

For pay-per-call ads, calls may be logged in to a call center in communication with platform 102. Based on the phone number that was dialed by a user, platform 102 is able to track the call back to a publisher and advertiser. Historical tracking data may be used, for example, to determine user preferences such as that people don't like certain ads (maybe for unknown reasons). Future ad delivery and distribution curves may be adjusted based on this feedback.

FIG. 3 shows an example of a web page 302 having advertisements displayed to a user on a user terminal according to one embodiment. An advertising area 304 presents a listing of the set of advertisements sent from platform 102 to publisher 104, 106. Advertising area 304 includes a number of ad units 308. These correspond to, but are not necessarily identical to, ad units 114, 116 retrieved by, or finally assembled at, advertising platform 102. A set of listings 306 are non-sponsored (e.g., free) search results presented in response to a search request of a user viewing web page 302 on a user terminal 141.

Figure 4:
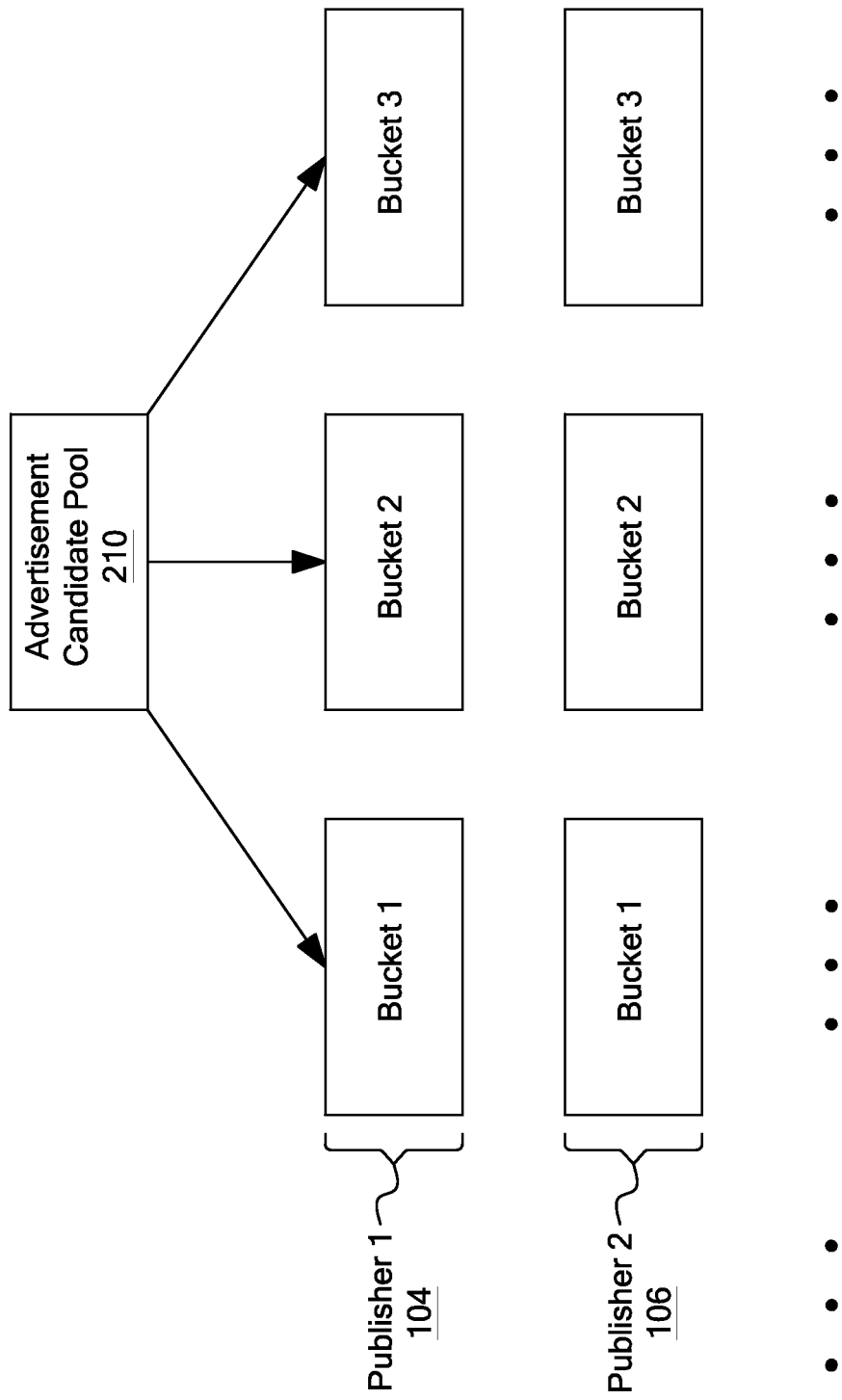
FIG. 4 shows the sorting of advertisements prior to sending to publishers according to one embodiment.

FIG. 4 shows the sorting of advertisements prior to sending to publishers according to one embodiment. The final ads in candidate pool 210 (after any use of filtering process 218) are sorted. In particular, layering is applied to the final ads in pool 210. The ads in pool 210 are sorted into different buckets (or layers) for each publisher. For example, (Buckets 1, 2, 3 for publisher 104; or Buckets 1, 2, 3 for publisher 106).

Different priority levels are created (corresponding to each bucket) as to which ads should be sent to a publisher before other ads. For example, if it is desired that pay-per-call ads are sent first, then the pay-per-call (PPC) ads in the candidate pool 210 would be sorted into the first bucket (Bucket 1), and all other ads in pool 210 may be sorted into Bucket 2. Bucket 3 may be used for yet further sorting by another type of ad. In one embodiment, this sorting into buckets will always take precedence over any other rules when selecting ads to send in response to an ad request.

Now, within a particular bucket (e.g., Bucket 1), an intermediate sorting algorithm may be applied to further select a set of advertisements. The algorithm may be, for example, a weighted ad rotation algorithm (discussed in more detail below), or the assigning of tiers and points to the ads in candidate pool 210. Other sorting criteria may include sorting by yield or based on predictions of revenue for a particular advertisement.

Then, ads are selected primarily from the highest priority bucket (obtained from the intermediate sorting above) and used in a priority order. As one example, if three ads are needed for an ad request, and there are two buckets from the sorting above, then two ads may be taken from the first bucket and one ad from the second bucket in order to fulfill the ad request. The one ad from the second bucket would be based on the intermediate sorting logic being applied in that bucket (note that the intermediate sorting logic may be different for each bucket).

After the final ads for delivery are selected per the above approach, then a final sort may be done based on the particular business requirements of the publisher. These requirements may relate to any one of several sorting mechanisms. For a given publisher, the ads from a bucket may merely be randomized, or ads may be sorted by tiers and points (e.g., a point score based on certain business factors such as product features purchased) for contractual reasons, or there may be some other final sort order imposed on the set of advertisements sent to the publisher. In some embodiments, this final sorting may also include sorting by distance of a service (e.g., a restaurant) from a user's current location, or by spending data (e.g., higher spending by a particular publisher, thus providing higher revenues), or other factors such as conversion probability.

Figure 5:
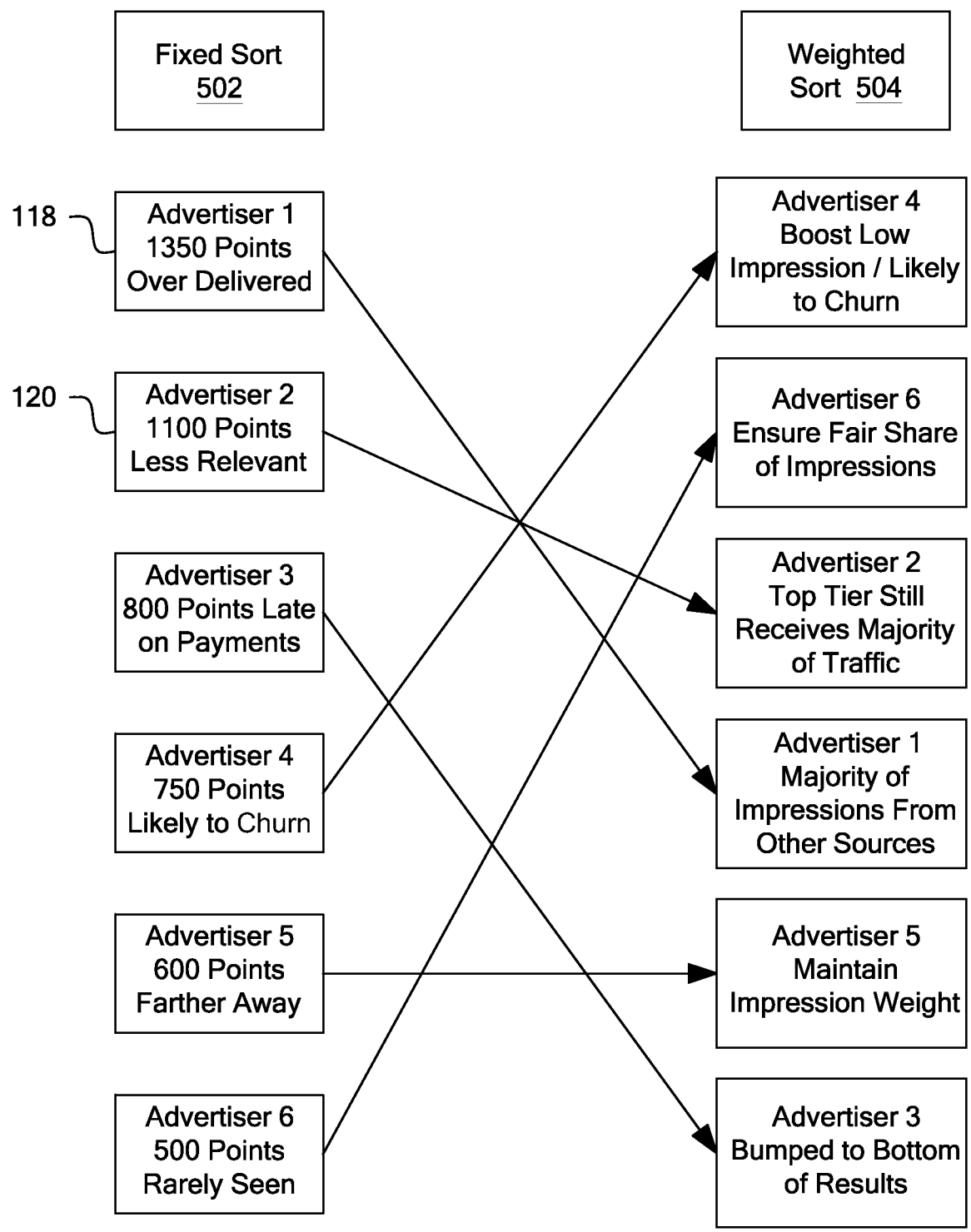
FIG. 5 shows an example of weighted advertisement rotation according to one embodiment.

FIG. 5 shows an example of weighted advertisement rotation according to one embodiment, which may be applied to advertisements in a given bucket (e.g., Bucket 1) as described above. A fixed sort 502 and a weighted sort 504 are illustrated—each sort may correspond to ads in a bucket from the sorting discussed above. In fixed sort 502, advertisers 118 and 120 are sorted based on a points score. In weighted sort 504, a weighted advertisement rotation is used that assigns weights to the ads based on relative spending by each advertiser, and rotates ad impressions based on that assigned weight (i.e., ads with higher weights receive more impressions). In one embodiment, ads that receive more (or less) total traffic relative to their assigned weights are sent to publishers in a manner so that they are given less (or more) impressions to users.

In one embodiment, the weights are based upon points, and the churn propensity for a given advertiser and the total click volume (across all traffic sources) can be used to vary the assigned weights up or down. Platform 102 may also segment advertising traffic by algorithm and/or by publisher to test the impact on traffic distribution curves across different configurations.

In another embodiment, ads from candidate pool 210 are sorted into different buckets. Based upon the spin of an ad and other factors, the ads are all weighted and then randomly picked from a bucket based upon these weights. For example, a given bucket may include both pay-per-call and subscription ads. Further, this approach can be turned on or off for each publisher.

In one embodiment, for fixed sort 502 each advertiser has a number of points based on the amount it is paying for its advertisement. For weighted sort 504 the order of the ads will be shifted around for various reasons (e.g., various reasons as discussed herein). Here, advertiser 4 is placed in the top slot for this particular search request. Advertiser 1 has already been delivered all of the impressions that were promised, so a lower ordering is used for this ad request.

In one embodiment, advertising platform 102 handles publisher and ad specific rules without requiring code changes by use of a configuration mechanism. At the configuration level rules may be defined on platform 102 for each publisher, for example, using JavaScript object notation (JSON). Some publishers may always place pay-per-call ads first because these achieve the best monetization. Other publishers may place subscription or other ads into the ad rotation so that there is rotation between two types of ads. Platform 102 lets each publisher control whether certain types of ads are boosted in priority over other types of ads. For example, ads from competitors may be placed fairly low into the ad mix (e.g., by putting these ads into a lower priority bucket, or mixing the ads in a bucket in with a lower weight). This may be handled through this configuration mechanism. In some embodiments, a publisher may only prefer ads which have phone numbers, or physical addresses, as the publisher may believe that these types of ads create more value for users visiting its website.

Figure 6:
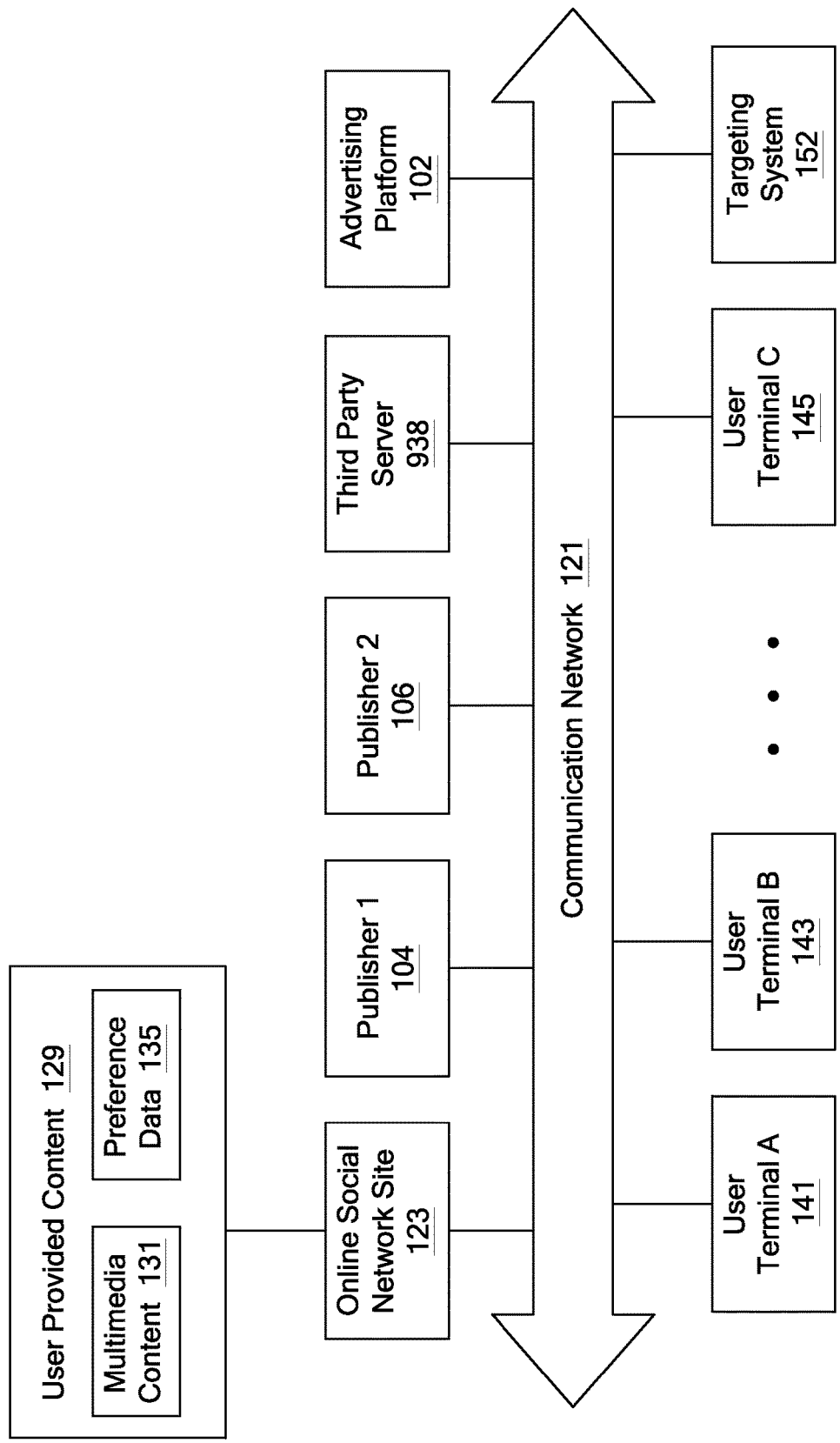
FIG. 6 shows a system for communications between user terminals, publishers, and the advertising platform of FIG. 1 according to one embodiment.

FIG. 6 shows a system for communications between user terminals, publishers, and the advertising platform 102 according to one embodiment. In FIG. 6, the user terminals (e.g., 141, 143, . . . , 145) are used to access websites of publishers 104 and 106 over a communication network 121 (e.g., the Internet, a local area network, or a wide area network).

The user terminals may also access other websites, for example an online social network site 123 over communication network 121. The user terminals may access yet other websites (not shown). Publishers 104 and/or 106 also communicate with advertising platform 102 over communication network 121. Advertising platform 102 may also communicate with ad databases 110, 112 over communication network 121. Advertising platform 102 sends advertisements to publishers 104, 106, which send a web page to a user terminal for display of the web page to the user, which includes one or more of these advertisements as determined by the publisher when rendering the web page for sending to the user terminal.

The publishers 104 and 106 and/or online social network site 123 may include one or more web servers (or other types of data communication servers) to communicate with the user terminals (e.g., 141, 143, . . . , 145). The online social network site 123 is connected to a data storage facility to store user provided content 129, such as multimedia content 131, preference data 135, etc.

In other embodiments, targeting system 152 communicates with advertising platform 102 using communication network 121. Third party server 938 (discussed below with respect to FIGS. 10*a* and 10*b*) also may communicate with targeting system 152, user terminals 141, 143, or 145, and/or advertising platform 102 via communication network 121.

In FIG. 6, the users may use the terminals (e.g., 141, 143, . . . , 145) to make implicit or explicit search or other requests for services. The user selections can be used as implicit recommendations. The publishers 104 or 106 may send information related to these requests to advertising platform 102. A search request may be seeking information regarding services at a certain location.

In one embodiment, the user terminal (e.g., 141, 143, . . . , 145) can also be used to submit multimedia content (e.g., 131). For example, in one embodiment, the user terminal includes a digital still picture camera, or a digital video camera. At a transition point, the user terminal can be used to create multimedia content for sharing with friends in the online social network 123.

Alternatively, the multimedia content can be created using a separate device and loaded into the online social network 123 using the user terminal (e.g., 141, 143, . . . , 145). The users may manually tag the multimedia content with personal data or data related to the user's current experience at a location.

Although FIG. 6 illustrates an example system implemented in client server architecture, embodiments of the disclosure can be implemented in various alternative architectures. For example, the publishers 104 and 106, and online social network 123 can be implemented via a peer to peer network of user terminals, where the multimedia content and other data are shared via peer to peer communication connections.

In some embodiments, a combination of client server architecture and peer to peer architecture can be used, in which one or more centralized server may be used to provide some of the information and/or services and the peer to peer network is used to provide other information and/or services. Thus, embodiments of the disclosure are not limited to a particular architecture.

Figure 7:
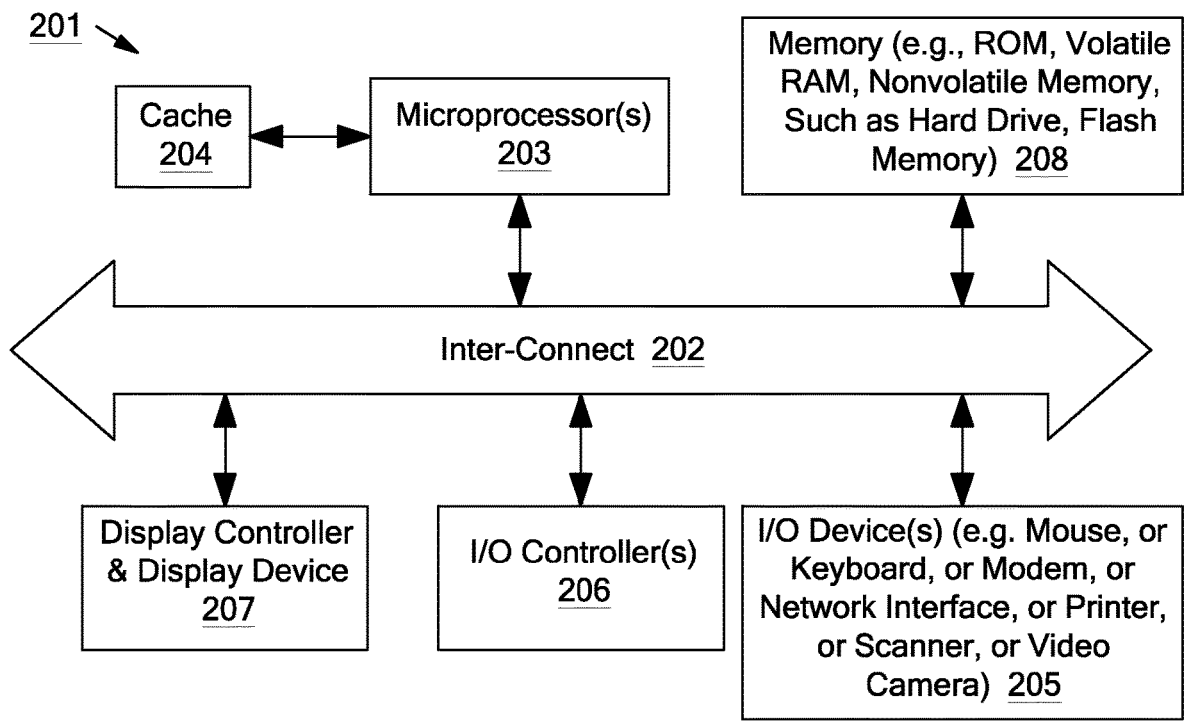
FIG. 7 shows a block diagram of a data processing system which can be used in various embodiments.

FIG. 7 shows a block diagram of a data processing system which can be used in various embodiments. While FIG. 7 illustrates various components of a computer system, it is not intended to represent any particular architecture or manner of interconnecting the components. Other systems that have fewer or more components may also be used.

In FIG. 7, the system 201 includes an inter-connect 202 (e.g., bus and system core logic), which interconnects a microprocessor(s) 203 and memory 208. The microprocessor 203 is coupled to cache memory 204 in the example of FIG. 7.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 7 is used to implement advertising platform 102, servers for publishers 104, 106, online social network site 123, and/or other servers, such as a server to support various advertisement databases.

In one embodiment, a data processing system as illustrated in FIG. 7 is used to implement a user terminal. A user terminal may be in the form of a personal digital assistant (PDA), a cellular phone, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 8:
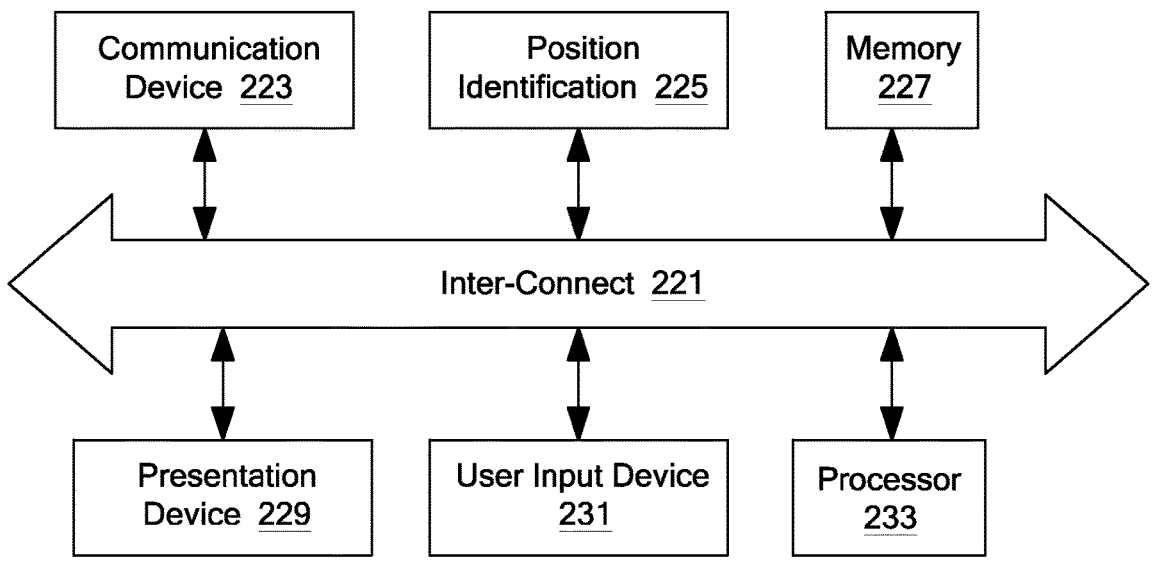
FIG. 8 shows a block diagram of a user terminal or device according to one embodiment.

FIG. 8 shows a block diagram of a user terminal or device according to one embodiment. In FIG. 8, the user device includes an inter-connect 221 connecting the presentation device 229, user input device 231, a processor 233, a memory 227, a position identification unit 225 and a communication device 223.

In FIG. 8, the position identification unit 225 is used to identify a geographic location of the user (e.g., a location may be provided to publisher 104 from user terminal 141 when a user makes a search request). The position identification unit 225 may include a satellite positioning system receiver, such as a Global Positioning System (GPS) receiver, to automatically identify the current position of the user device. Alternatively, an interactive map can be displayed to the user; and the user can manually select a location from the displayed map.

In FIG. 8, the communication device 223 is configured to communicate with publisher 104 or 106, or an online social network 123 to provide user data content tagged with other data provided by the user or automatically provided by the user terminal. The user input device 231 may include a text input device, a still image camera, a video camera, and/or a sound recorder, etc.

Figure 9:
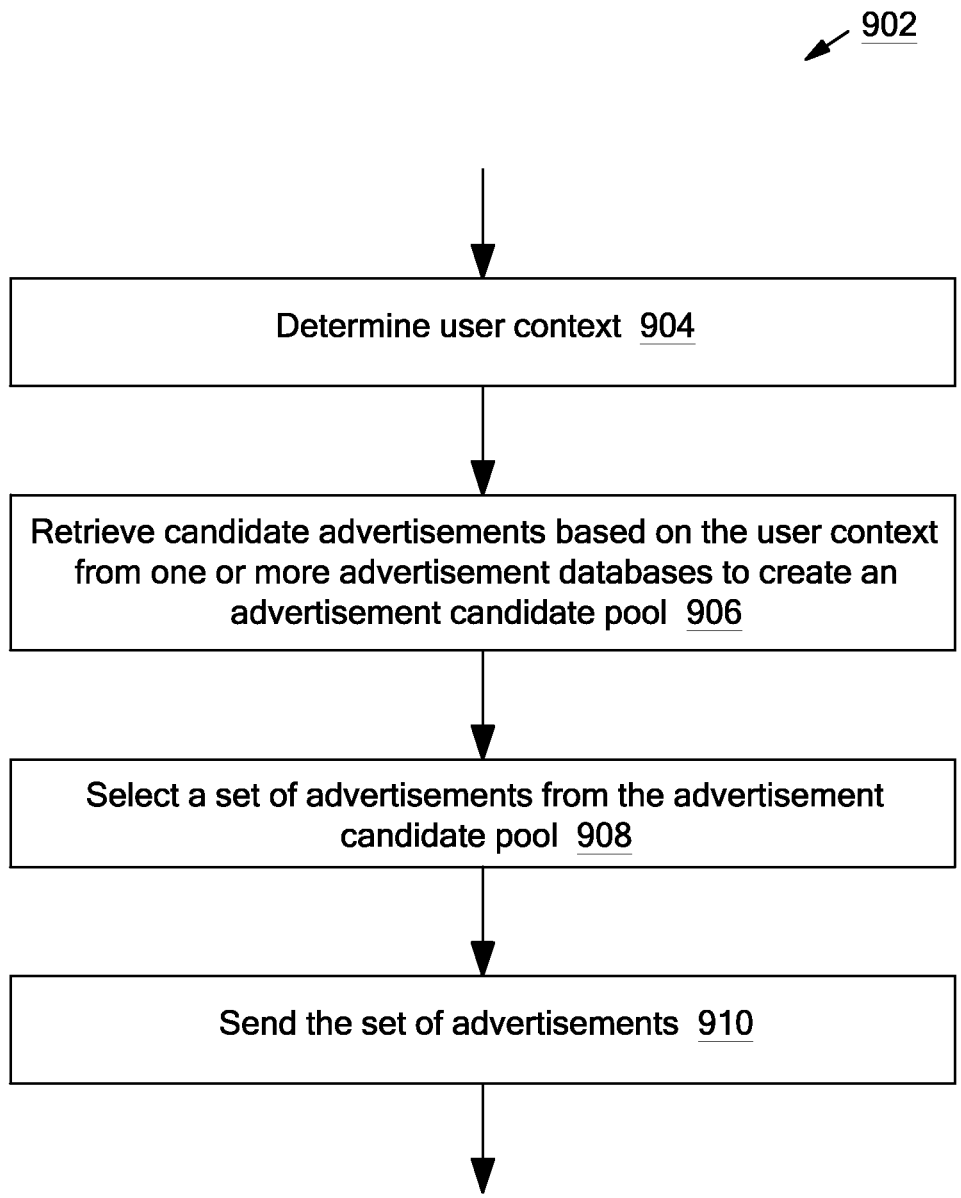
FIG. 9 shows a method to select an advertisement from at least one database using the advertising system of FIG. 1 according to one embodiment.

FIG. 9 shows a method 902 to select an advertisement from at least one database using advertising system 102 of FIG. 1 according to one embodiment. In block 904, a user context is determined. In block 906, advertising platform 102 retrieves candidate advertisements from one or more advertisement databases to create an advertisement candidate pool. The user context is used in this retrieving.

In block 908, a set of advertisements is selected from the advertisement candidate pool (e.g., the ads are selected in order to reply to an ad request from a publisher prompted by a user search request). In block 910, the set of advertisements is sent from advertising platform 102 to publisher 104 or 106.

In one embodiment, in addition to selecting ads based on user context, the ad selection may be further based on user location. As an example of geographic relevance, consideration is given to how ads will perform for a given ad request in part based on the location of the user. For example, a distinction is made between direct and indirect matches so that if a user is searching for pizza in Glendale, then an ad for a pizza place in Glendale will perform better than an ad for a pizza place in a nearby city. So, a direct match (e.g., either a city name or a zip code) is given a higher priority over factors that are only an indirect match (this is direct and indirect layering).

In one embodiment, ads are generally selected so that the advertiser's location is closer to what the user is searching for. Advertisers only pay for presence when using subscription ad products, and not for specific impressions or specific value of any kind. So, the advertising space is expanded somewhat in order to distribute the ad traffic better for these particular advertisers. Although a pure distance sort might be best for conversions, it is not the most ideal for distributing advertising value.

One specific example of preparing a reply to an advertisement request from a publisher is now described. In this example, there are two types of ads (subscription and pay-per-call). A search request is received from a publisher, and the request includes some context about the ad that the publisher desires to show. Here, a user has made a request related to a terminal location using keywords such as "pizza", "restaurant", and "Glendale". These keywords are next turned into candidate ads as discussed above.

In this example, platform 102 implements processes related to its subscription ad listings. These keywords are run through a categorization process in which the word "pizza" is mapped into a category of "pizza restaurants", and may be further mapped to secondary categories of "Italian restaurants", etc. The location key word is mapped into a geography category.

Some ads are sold for limited service areas, and some ads are sold nationally. These categories and locations are used to do a reverse index search in order to retrieve ads that match the categories and locations. So, all ads under the category "pizza restaurants" becomes the initial candidate pool (i.e., this provides ad candidates for subscription ads). For pay-per-call ads, the keywords and the location are used to select pay-per-call ads (e.g., within a predetermined diameter or distance of a user location, or in a zip code associated with a particular business location). For example, further candidate ads are retrieved for an advertiser wanting customer calls within five miles of its business, and where the customer has used the word "pizza" in its search. These ads are added to the candidate pool.

In this example, a normalization process is applied to put all of the ads in the candidate pool on an equal footing so that any of the sorting/selection algorithms can work on any of the ad types in the ad candidate pool. Some de-duping may be applied to filter the results and other filtering performed as discussed above. For example, filtering may be done based on rules in which a publisher states it does not want any ads of a mature/adult nature, or it only wants ads with phone numbers because the publisher's business relies on mobile phone communications with customers. After filtering, a final ad candidate pool is obtained. The ad selection processes and algorithms described above are then applied to select a final set of advertisements for sending in reply to an advertisement request.

Prior to sending the final ads, the ad may go through a final step of preparing them for display. For example, for pay-per-call ads, the ads may go to another system in platform 102 that generates a call-tracking number that is appropriate for the publisher requesting the ads.

Figure 10A:
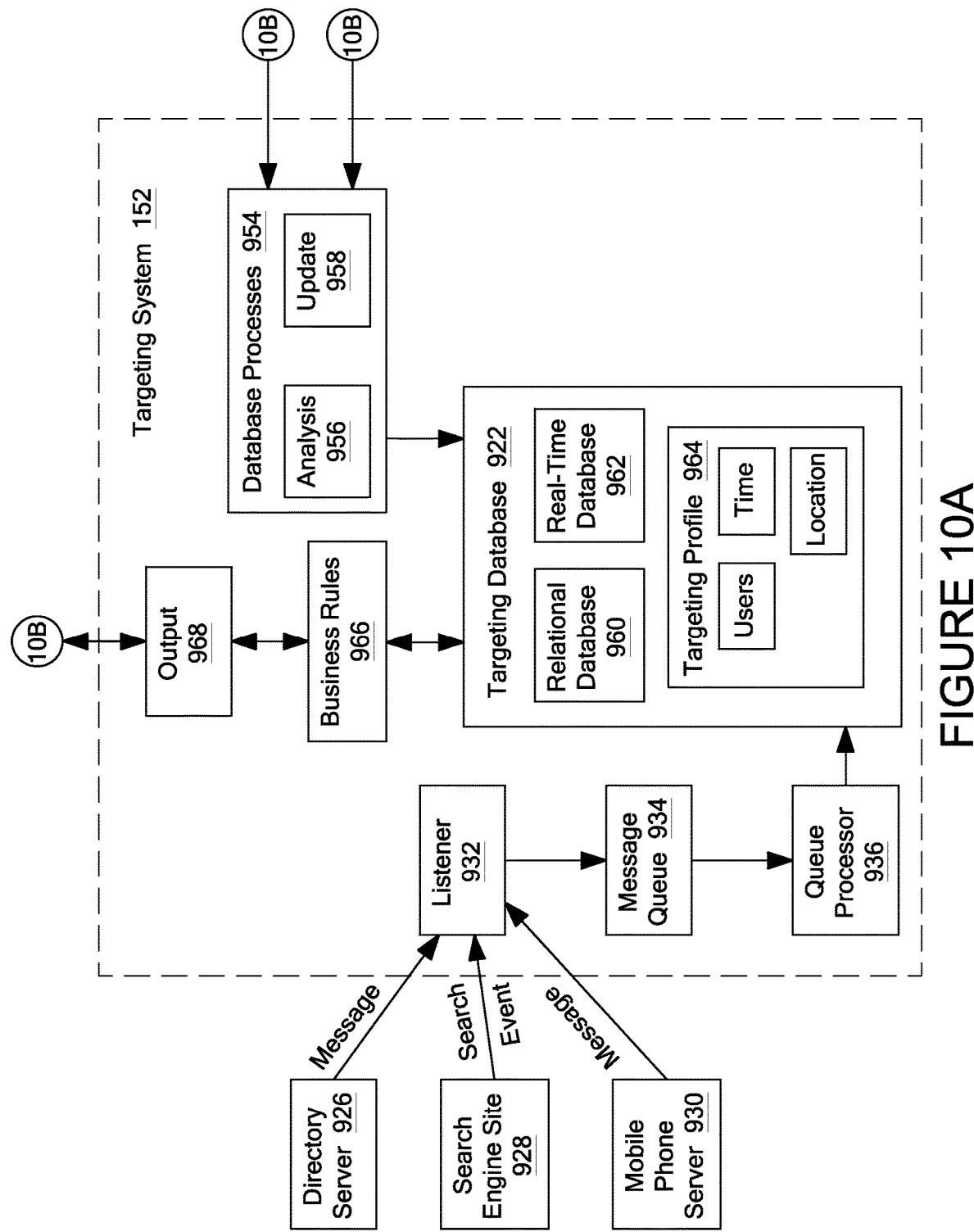
FIGS. 10A and 10B show a targeting system used to provide information about users in response to requests corresponding to user devices according to one embodiment.
Figure 10B:
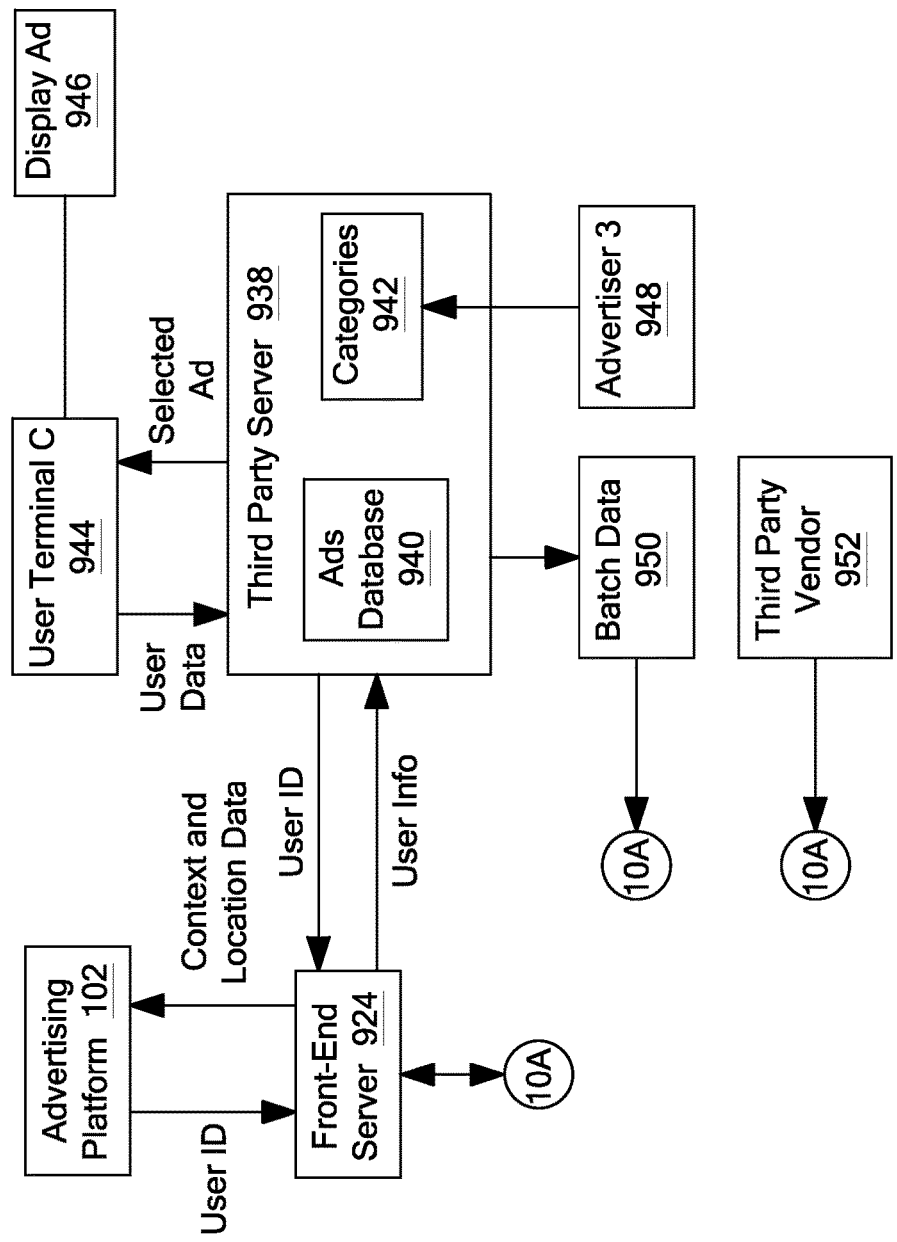

FIGS. 10*a* and 10*b* show a targeting system 152 used to provide information about users in response to requests corresponding to user devices (e.g., a request associated with activity or the presence of a user on one or both of user terminals 141, 143) according to one embodiment. Targeting system 152 includes a targeting database 922 (as was briefly discussed above with respect to FIG. 1).

In order to create and update database 922, targeting system 152 receives messages from various servers and/or other computing systems on or with which users interact, or that obtain information from yet other systems with which users interact in some manner. These servers or systems may include, for example, directory server 926, search engine site 928, and mobile phone server 930. In one embodiment, these messages are sent using user datagram protocol (UDP) broadcasting (e.g., using light weight event system (LWES) messages). Each of the messages includes an event corresponding to a user device (e.g., a laptop, mobile phone, etc.), and each of the messages is sent from a server as a UDP broadcast (e.g., the server may act as an L WES emitter that sends the L WES messages).

Messages from search engine site 928 each include, for example, information related to an event on a user device (e.g., a search event such as a search request made by a user to search engine site 928). In the case of a search request, the message includes search terms used by the user in the search request provided as input on the user device.

The messages are received by targeting system 152 (e.g., over a network such as communication network 121). In one embodiment, a listener process 932 receives these messages and listens for events and information that may be useful for targeting database 922. In one embodiment, listener process 932 is an L WES process that listens for L WES events in the messages. Messages selected by listener process 932 are provided to message queue 934. A queue processor 936 processes data in message queue 934 in order to create or update user profiles that are stored in targeting database 922.

User profiles are stored as targeting profiles 964. These user profiles include a user profile for each of many unique users represented in the messages received by listener process 932, or represented in other data received by targeting system 152 (e.g., batch data 950). Each user profile is generally identified by a user identifier. In some embodiments, the user identifier is a subscriber identifier that is already known (e.g., a subscriber ID previously assigned to a user of a mobile device by a server associated with targeting system 152). The subscriber identifier may be, for example, an identifier that is assigned to a subscriber when a person obtains a mobile phone usage account from a mobile phone service provider.

In other embodiments, the user identifier may be a tracking unique identifier (TUID). The TUID may be generated by targeting system 152, or by another system, when information is first received about a user not previously known to the system. In yet other embodiments, the user identifier may be an identifier of the mobile device obtained from the mobile device. The user identifier (e.g., subscriber ID, TUID, or mobile device identifier) may be used to retrieve a user profile from database 922, and used to associate new information collected about a user with this existing user profile.

Other types of profiles may be created and stored in targeting database 922. Such profiles may include a time profile and a location profile. The time and location profiles are created, e.g., using data collected from the messages received by listener process 932.

Targeting database 922 may have a dual architecture in which data is stored in both a relational database 960 and a real-time database 962. More complex data records are stored in relational database 960. Lighter weight data records (e.g., a portion of or a condensed representative of a corresponding complex data record for the same user) are stored in real-time database 962 so that access time is faster when a request for user information is received.

In one embodiment, in order to build a profile 964 for a given user, information is collected from one or more systems (e.g., directory server 926, mobile phone server 930, and/or search engine site 928) that interact with the user's input (e.g., a call made by the user, or a search request received from the user), and/or that represent other usable information about that user. For example, when a user performs a search, the search engine might share information about the user's search term, location, and the time of day the request was made. Another system (e.g., a system implementing a click wrapper or a website) may provide information about which of the search items returned as results were actually selected by the user.

In one embodiment, if systems (e.g., search engine site 928 and mobile phone server 930) are sharing user information by broadcasting messages over user datagram protocol (UDP) (e.g., using a system like LWES, and packaging the data into generally consumable Protocol Buffer objects), then any system (e.g., targeting system 152) which wants access to that data (and is on the same secure network as the systems sharing the data), can listen to those UDP messages and decode them. This collected data can be normalized and collated into a usable form by targeting system 152, which analyzes the activities performed by a given user.

In one embodiment, targeting system 152 collects information from systems interacting with users and records information about the interactions in user profiles as discussed above. More specifically, these interactions can be collected and analyzed to build a history of the user's activities, in order to permit an improved understanding about an individual user and to enable more precise targeting based on each specific user (e.g., a user identified in targeting database 922 using a subscriber ID or a TUID).

In one embodiment, requests for information sent to targeting system 152 are received by a front-end server 924. In response to these requests, information is retrieved from targeting database 922 and provided as output 968. The data in output 968 may be filtered by business rules 966 prior to sending output 968 to front-end server 924. Business rules 966 are, for example, limitations on types of data (e.g., adult material) or restrictions on use of ads of competitors similarly as discussed above for business rules 214.

Requests for information to front-end server 924 may be received from advertising platform 102 or from a third-party server 938 (e.g., such as web server 154 of FIG. 1 when server 154 is controlled by an entity different from the entity controlling advertising platform 102). Requests from advertising platform 102 may include a user identifier as discussed above (e.g., the subscriber ID corresponding to a mobile phone of the user).

The data provided from targeting system 152 in response to the request may include user context and location data. In some embodiments, the response may include multiple search terms or multiple sets of user context/location data. The user context and location data may be used as inputs to advertising platform 102 (e.g., for processing similarly to and in place of the search request and location obtained from a user search request as was described above for advertising platform 102).

In one embodiment, third-party server 938 submits a user identifier and receives user information corresponding to a user profile matching the user identifier. Third-party server 938 includes an advertisements database 940 and record of categories 942, which may include a set of categories used to select sets of advertisements for providing to a particular user of a user device such as user terminal 944. An advertiser 948 may communicate to third-party server 938 certain select categories that are desired for providing advertisements of advertiser 948 to various users.

When third party server receives information about a user from targeting system 152, the information is used to select one of categories 942 desired by advertiser 948. One or a set of advertisements are selected from the one desired category and sent to user terminal 944 (e.g., for weighted rotation or other form of presentation of ads as discussed herein).

User terminal 944 provides user data to third-party server 938 when being operated by a user. This user data may include the time of day, the geographic location of user terminal 944, search terms submitted in a search request by the user of user terminal 944, and/or other information. Third-party server 938 uses this user data (which may include a user identifier) to make a request for information from targeting database 922 as discussed above. Using the user information received in response to this request, third-party server 938 selects an advertisement to send to user terminal 944. This advertisement may be a display ad 946 that is displayed on a user display of user terminal 944. This display ad may correspond to a category selected by third-party server 938 from categories 942.

The data in targeting database 922 may be further modified, updated, or otherwise processed by database processes 954, which may include an analysis process 956 and an update process 958. Third-party server 938 may provide batch data 950 regarding various users that access server 938. Batch data 950 may be used by update process 958 to update the user profiles in the targeting database 922. Analysis process 956 analyzes data to create additional user relationships or correlations to other data that are used to update applicable user profiles. Update process 958 receives batch data or other data feeds and updates applicable user profiles using this data.

Various vendors of online services, including third-party vendor 952, may provide user information to update process 958. This user information may be correlated with existing user profiles in targeting database 922, and the user profiles updated, for example, periodically such as hourly, daily, or weekly. This vendor information may be in addition to batch data 950, or may be processed as part of batch data 950.

Figure 11:
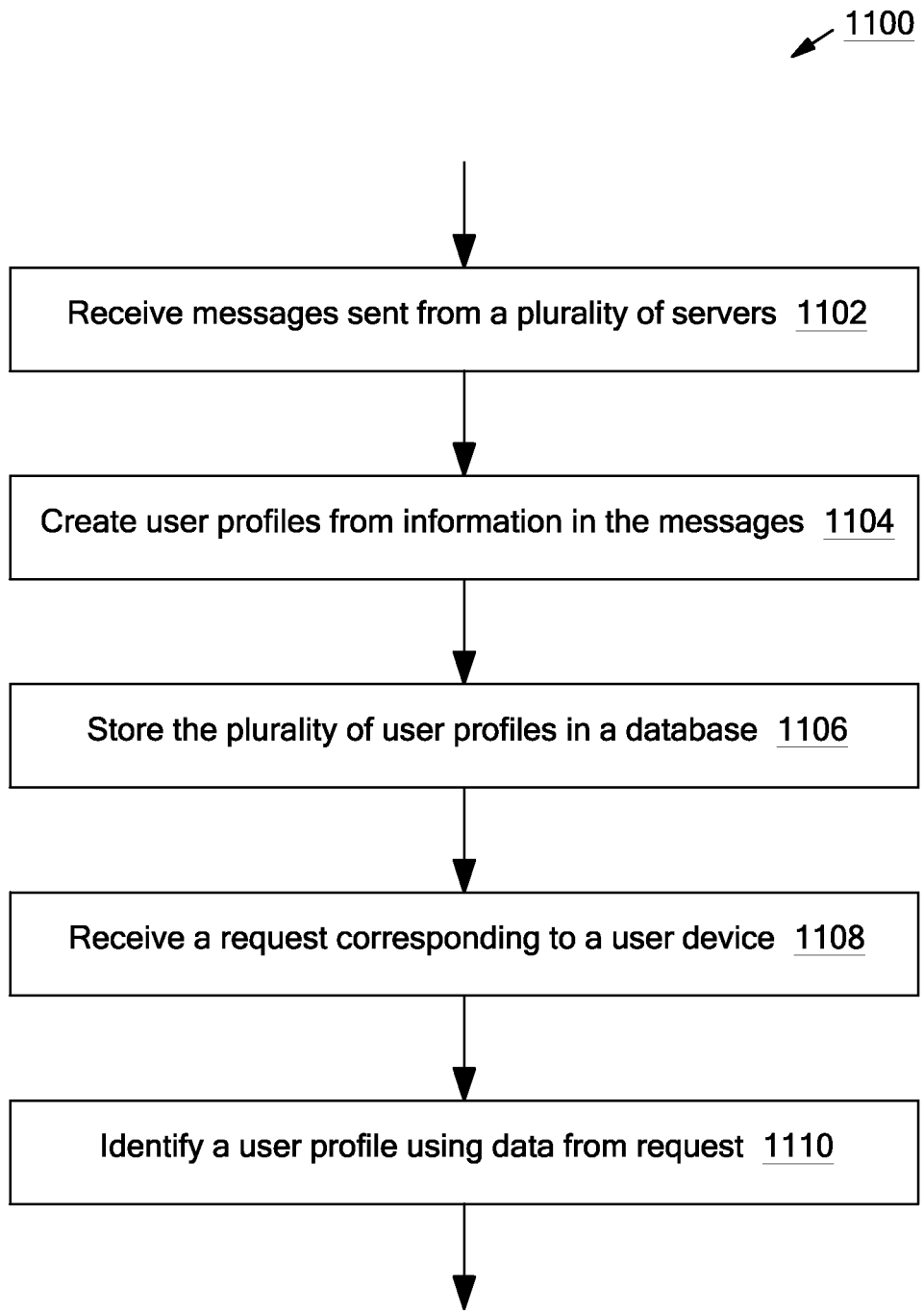
FIG. 11 shows a method to create user profiles for users and provide information about a user from a selected user profile according to one embodiment.

FIG. 11 shows a method 1100 to create user profiles for users and provide information about a user from a selected user profile according to one embodiment. In block 1102, listener 932 of targeting system 152 receives messages sent from various servers (e.g., mobile phone server 930). In block 1104, targeting system 152 creates user profiles from information obtained from or derived from data in the messages received.

In block 1106, targeting system 152 stores the user profiles in targeting database 922. In block 1108, front-end server 924 receives a request corresponding to a user device. The request may be sent by third party server 938 or by advertising platform 102. The user device may be a mobile phone, and the request may relate to a display ad to be shown on the mobile phone, or may relate to a user search request entered by the user of the mobile phone to request information on a topic related to search terms entered by the user into the mobile device.

In block 1110, targeting system 152 identifies a user profile using data from the request. In one embodiment, a record corresponding to the user profile is retrieved from either relational database 960, or from real-time database 962. Data from the user profile is sent to the requesting data processing system (e.g., the data may be user context and location data sent to advertising platform 102 for use in selecting a set of advertisements for presentation to the user of the mobile device).

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

On implementation of the technology as disclosed and claimed is a method for providing targeted advertisements over a wide area communication network to a user interfacing with a website, where the method includes communicably linking over a wide area communications network a user device, a publisher server system, and advertising platform server, an advertiser and a targeting server system. The method further includes programming and processing on the advertiser platform server advertising selection process software instructions, logging process software instructions, sort and rotate process software instructions, scoring algorithm process software instructions and an advertising filtering process software instructions. The method further includes programming and processing on the targeting server system listener process software instructions and database process software instructions; and populating an advertisement candidate pool database with candidate advertisements where each candidate advertisement has an associated annotation provided and communicably coupling the advertisement candidate pool database with the advertiser platform server. One implementation includes processing by the listener process software instructions processing at the targeting server system a plurality of messages received by the targeting server system, the plurality of messages including a first message, each message of the plurality of messages being sent from a respective server of a plurality of servers, and the first message including first user event data, where the processing of the listener process software instructions configures the targeting server system to queue at least two of the plurality of messages and pull the messages from the queue and store. The method includes generating geographic location data representative of the user device geographical location with a position identification unit of the user device and providing the geographic location data to the publisher server system and collecting with the targeting server system the geographic location data, detected by the position identification unit, of the user device of the first user; and creating and updating by the listener process software instructions executing on the targeting server system a plurality of user profiles from information in the plurality of messages, the plurality of user profiles each having a user identifier and including: a first user profile corresponding to a first user and comprising first information from the first user event data; and a second user profile corresponding to the first user and comprising a condensed representative of the first user profile, wherein the second user profile is created based at least in part on a search request received from the user device.

One implementation of the method includes storing, by the targeting server system, the plurality of user profiles in a targeting database system having a dual architecture, the storing comprising storing the first user profile in a first relational database data store of the dual architecture and storing the second user profile in a second real-time database data store of the dual architecture, wherein the second data store is a key cache for serving the second user profile in real-time; and fulfilling by the advertiser platform server system an advertisement demand at least in part by, processing the plurality of messages received by the advertising platform server system processing the listener process software instructions to identify a request corresponding to the user device. One implementation includes identifying and accessing the second user profile from the second real-time database data store using data from the plurality of messages and the request; and generating by the sort and rotate process software instructions processing at the advertising platform server system, using data from the second user profile, two or more layers of advertisements from a candidate pool of advertisements, where sorting is performed by the sort and rotate process based on business rules and user context, wherein the fulfilling is independent of accessing the first user profile. One implementation includes, ranking by the scoring algorithm process software instructions processing at the advertising platform server system the two or more layers of advertisements in an order of priority, where the scoring algorithm process is based on one or more of cost and historical performance; and selecting by the advertiser selection process software instructions and advertising filtering process software instructions processing at the advertising platform server system a final set of advertisements from the two or more layers of advertisements in accordance with the order of priority and the intermediate sorting process, the final set of advertisements comprising a first set of one or more advertisements corresponding to a first layer of the two or more layers of advertisements retrieved from a first advertisement database and a second set of one or more advertisements corresponding to a second layer of the two or more layers of advertisements retrieved from a second advertisement database, the first set and the second set of advertisements selected based at least in part on (a) the detected geolocation of the user device and (b) one or more user preferences determined from the second user profile. The method further includes, transmitting to the user device visible content by the advertising platform server system representative of the final set of advertisements configured for display to a display device user terminal of the user device in accordance with the final sort to thereby enable the first user to interact with the final set of advertisements via the display device.

Advertising Platform Example

A non-limiting example for one specific embodiment of advertising platform 102 is now discussed below. This example describes certain high-level aspects of the logic and flow used for ad delivery. Platform 102 may implement its logic in Java.

Initial Inputs

This section describes ways that advertising platform 102 may be called. This corresponds generally to a publisher passing a search term and search location in to platform 102.

After resolving parameters associated with these inputs, the following are obtained:

Publisher partner code
User search term
User search location
Search type: Name, Category, or Term. A "name" search term is interpreted as a business name. A "category" search term is interpreted as a category or keyword. A "term" search will be interpreted by platform 102 according to the "most likely" meaning.

Retrieving Candidate Ads

This section describes the initial step of collecting candidate ads from different ad sources. In this case, this includes details on how to take the search term and search location, and to get a list of the ads which are eligible for display. There are two sources (subscription and pay-per-call) described in more detail in each of the sections below. For a given publisher/ad request, one or both of the sources will be called to find candidate ads. If no candidate ads are returned, then no ads are sent to the publisher.

The first step is to find a set of candidate ads, which can be selected from. Based on the user search term and geography, candidates can be identified. There are two paths, which may be run in parallel: retrieving subscription ads and PPC ads. The two paths are described below. Note that depending on the publisher configuration, only one of the paths maybe used.

Retrieving Subscription Ads

This section describes how to determine eligible subscription ads (listings).

First, an internal system is used to resolve the plain text search term and location into machine-usable information. Locations will be mapped into either lat/lon positions, or other common things like city and state, neighborhoods, or points of interest (e.g., major airports or landmarks).

The search term will be matched against both business names and categories, with the most likely interpretation being chosen. After analyzing the search term, it will be classified as either a category search, with a list of associated categories, or as a name search, with a list of associated businesses, or as an unknown term (in which case no ads will be returned).

Based on the determined geographies and categories, a list of relevant ads are retrieved from a high performance index which has been prepared to make such retrieval highly efficient.

Retrieving PPC Ads

This works in a similar fashion to the subscription ads, but using a system which has been tuned towards the pay-per-call model. For example, this will enforce hours of operation, so ads are not shown for businesses where the phones are not currently being manned, as calls to these numbers will generate no revenue. Furthermore, there may be budget issues where an advertiser only wants to spend a fixed amount of money, so their listings would not be available after they received a sufficient amount of calls.

Filtering Ads

Once the list of eligible ads is obtained from each source, there is extra business logic that may depend on the specific publisher that is requesting the ads. These filtering rules narrow the set of listings to the final candidate pool.

Filtering may occur during the retrieval step, if the filter is specific to subscription or PPC listings, or may occur after the ads have been combined into a single list. Platform 102 may support the following filtering options:
  address required will filter out ads with no visible address.
  phone required will filter out ads with no visible phone number.
  business_names will filter out ads with matching business names (this might be used to
  blacklist competitors from a specific publisher's sites).
  strict_geo matching will filter out SUB ads if there was an explicit city or zip in the
  search, and the ad does not contain the same city or zip.

Selecting Ads

This section describes the step where the ads are put in the candidate pool, and chooses the ads that will be provided for this specific ad call (i.e., ad request). First, normalization is done to make sure that the business rules can be run regardless of the source of the ads. Next, bucketing, scoring, and sorting logic is used to obtain the final set of ads.

The first step in ad selection is normalizing the subscription and PPC ads. This includes analyzing PPC performance and bid prices, and deciding how these should be handled relative to subscription products.

Additional Filtering: Ad Selection may perform additional filtering steps:
  De-duping. If any ads share the same business identifier, then only one of each
  matching listing will be kept. The one kept may be chosen randomly, to distribute
  traffic across the listings.
  Backfill logic. For name searches, depending on the name_searches configuration
  option, name matches or category matches may be supported.

After normalization, the ad selection process is run.

The final set of selected ads will be annotated for tracking and logging purposes. By recording information about how decisions were made, one can do bucket tests to see how different algorithms are performing, or measure nuances in how the system is behaving.

Formatting Ads

This is the final detail after the ads are selected that will be shown—anything necessary to show the actual listing is retrieved to assemble the final ads. This includes all the metadata (e.g., tag lines, image URLs, etc.) as well as allocating call-tracking numbers.

Once the final set of ads is obtained for display, additional information is retrieved to include in the reply to the ad request. The method to get this information is different for subscription and PPC listings—platform 102 may perform these calls in parallel.

Logging

This is how data is logged about what happened with respect to the ads—it becomes the core of the feedback loop where platform 102 can learn and improve over time (as well as use for basic details like reporting results to advertisers and paying publishers).

First, all requests and information about those requests gets logged by writing a record describing the request to disk. This record includes a unique identifier (UUID) which will be used to join subsequent user activity to the initial request. For a system more similar to being real-time, these records may also broadcast events over UDP which can be monitored by other systems. The request record will be associated with a list of all the impressions which are being shown: either subscription or PPC.

Next, all user activity which can be tracked should also record that information. Clicks will generally go through a special "click wrapper", which records the information about the click, and forwards the user to the destination URL. Information about each click will be associated with the original request via the UUID which was created to identify the request.

Information about phone calls is tracked via CTNs (call tracking numbers). This can be used to measure the performance of the system as a whole.

Targeting System Example

A specific, non-limiting example of one embodiment of targeting system 152 is now discussed below. This example relates to optimization of an advertisement display network. In order to optimize an ad display network, the more information that is known about any given customer or user, the better the targeting of selected ads to that user. This example is a sample implementation of a web service that performs the dual functions of collecting information about a set of users (in real-time where possible), and providing sufficient information about those users (in real-time).

An ad server (e.g., third party server 938) might receive a request to display an ad. This request would include a persistent, unique identifier to identify the user (i.e., a user identifier), and possibly include information about where that user is, or other information which the calling ad server knows about the user. The user's time of day can also be inferred from the server time and the user's location (if available).

The ad server calls a targeting server (i.e., targeting system 152), and passes the user identifier, requesting information about that user. The targeting server might respond with demographic information (from a known source, or inferred from user behavior), or with user interest profiles (e.g., a user might be interested in physical fitness). With this new information, the ad server will be able to better select a relevant ad.

The ad server communicates with the targeting server using a unique implementation key. This allows the targeting server to control which information is released in which use cases, to protect user privacy. Further, the targeting server includes the ability for the user to opt out if the user does not want to participate in this process.

In order to respond to queries like the one above, the targeting server needs to support collecting a wide variety of data, either via feeds, or via a real-time APL. For example, calls to a web server may log the user via a cookie, and send information about the user's interactions with the website (possibly including search history and interactions with the search results) to the targeting service. In one implementation, this data is sent by analyzing log files and creating a data feed which is processed on a regularly-scheduled basis. More optimally, this data might be collected into bundles of information in real-time and broadcast via UDP. This would allow the targeting service to respond very quickly, as a user may be in a context requesting display ads immediately after performing a search with relevant context.

The data, either via feed, broadcast messages, or other approaches, would be picked up and processed by the targeting service. A full history might be recorded in a database for a more thorough analysis, while an immediate profile (e.g., stored in real-time database 962) could be created to serve requests which might occur within a gap of just seconds. Keeping a set of profiles in a very efficient key/value cache is one way to make this data available to applications like the display ad server.

A more in-depth analysis of the collected data can be performed on a regularly scheduled basis (e.g., via analysis process 956). This may include categorization of the users into different behavioral clusters, and running longer, more processor-intensive processes to identify key traits and behaviors. The resulting analysis can be stored back in the key/value cache for serving profiles in real-time.

Targeting System Usage Examples

Several specific, non-limiting examples of the use of targeting system 152 are now discussed below. First, targeting system may be used for display advertising. If a user is browsing on a mobile phone, and there is an ad slot to show the user an ad, a request is made to advertising platform 102 stating a need for an ad for this user. Advertising platform 102 makes a request to targeting system 152 passes the user identifier for this user. A user record is pulled from the targeting database 922.

When a large company such as Ford purchases advertising, it wants to target, for example, males for trucks, or young mothers for SUVs. By saving search histories from prior searches of users in user profiles as discussed above, the targeting system 152 can target a traditional search ad against this user. The prior stored search history data can be used to make the local ad relevant to the user. Targeting system 152 knows that the user is interested in the particular ad because this interest is indicated in the user's history/profile.

Targeting system 152 may create a search context for a user based on information from prior search histories and other information. Then, advertising platform 102 can create a search term and a location for use in its normal processing flow. The targeting system 152 also may return multiple search terms that could be used by advertising platform 102 (e.g., cars and pizza). The targeting system 152 may also return multiple locations. Another feature that may be implemented by targeting system 152 is frequency capping (i.e., where the number of times that a particular ad is shown to a user is limited on a daily or otherwise time periodic basis).

There are various ways that categorization of ads may be implemented. In one approach, if no information is found about a user in the targeting database 922, the location of the user is used (e.g., for a mobile ad). The other information known is the time of day. So, average network performance as a function of geography and time may be represented in time and location profiles in targeting database 922.

Also, revenue performance as determined by feedback can be used to select ads. After ads are used, whether the ads work well or not can be determined using messages collected by listener 932. This information can be used to build models that can be adjusted based on things like seasonality (e.g., certain ads being preferred for certain holidays or seasons).

Another type of information sometimes available is the type of phone or other user device. Users on different phones often have different demographic tendencies, which can be stored in targeting database 922.

In another use case, ad slots are sold to an advertiser. The advertiser wants to target a certain type of user. Using the targeting system 152, user history is mapped back into the high level categories that are of interest to the advertiser (e.g., user interest in exercise or travel as determined based on prior user search histories). These search histories may also come from other search engines controlled by third parties. User profiles are built and mapped into categories. Then, ads may be sold for selected ones of these categories (e.g., an ad department may state that there are 4 million impressions for the category of fitness enthusiasts). So, when an ad request is provided the targeting system 152, a response is provided that identifies this user as a fitness enthusiast. One of the ads for this advertiser that targets the selected category is chosen and provided back for the ad request.

The various implementations and examples shown above illustrate a method and system for selecting advertisements for users. A user of the present method and system may choose any of the above implementations, or an equivalent thereof, depending upon the desired application. In this regard, it is recognized that various forms of the subject advertisement selection method and system could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the and scope of the present implementation(s). Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method for providing targeted advertisements over a wide area communication network to a user interfacing with a website, the method comprising:

communicably linking over a wide area communications network a user device, a publisher server system, an advertising platform server, an advertiser and a targeting server system;

programming and processing on the advertiser platform server advertising selection process software instructions, logging process software instructions, sort and rotate process software instructions, scoring algorithm process software instructions and an advertising filtering process software instructions;

programming and processing on the targeting server system listener process software instructions and database process software instructions;

populating an advertisement candidate pool database with candidate advertisements where each candidate advertisement has an associated annotation provided and communicably coupling the advertisement candidate pool database with the advertiser platform server;

processing by the listener process software instructions processing at the targeting server system a plurality of messages received by the targeting server system, the plurality of messages including a first message, each message of the plurality of messages being sent from a respective server of a plurality of servers, and the first message including first user event data, where the processing of the listener process software instructions configures the targeting server system to queue at least two of the plurality of messages and pull the messages from the queue and store;

generating geographic location data representative of the user device geographical location with a position identification unit of the user device and providing the geographic location data to the publisher server system and collecting with the targeting server system the geographic location data, detected by the position identification unit, of the user device of the first user;

creating and updating by the listener process software instructions executing on the targeting server system a plurality of user profiles from information in the plurality of messages, the plurality of user profiles each having a user identifier and including:
  a first user profile corresponding to a first user and comprising first information from the first user event data; and
  a second user profile corresponding to the first user and comprising a condensed representative of the first user profile, wherein the second user profile is created based at least in part on a search request received from the user device;

storing, by the targeting server system, the plurality of user profiles in a targeting database system having a dual architecture, the storing comprising storing the first user profile in a first relational database data store of the dual architecture and storing the second user profile in a second real-time database data store of the dual architecture, wherein the second data store is a key cache for serving the second user profile in real-time;

fulfilling by the advertiser platform server system an advertisement demand at least in part by:
  processing the plurality of messages received by the advertising platform server system processing the listener process software instructions to identify a request corresponding to the user device;

identifying and accessing the second user profile from the second real-time database data store using data from the plurality of messages and the request; and generating by the sort and rotate process software instructions processing at the advertising platform server system, using data from the second user profile, two or more layers of advertisements from a candidate pool of advertisements, where sorting is performed by the sort and rotate process based on business rules and user context, wherein the fulfilling is independent of accessing the first user profile;

ranking by the scoring algorithm process software instructions processing at the advertising platform server system the two or more layers of advertisements in an order of priority, where the scoring algorithm process is based on one or more of cost and historical performance;

selecting by the advertiser selection process software instructions and advertising filtering process software instructions processing at the advertising platform server system a final set of advertisements from the two or more layers of advertisements in accordance with the order of priority and the intermediate sorting process, the final set of advertisements comprising a first set of one or more advertisements corresponding to a first layer of the two or more layers of advertisements retrieved from a first advertisement database and a second set of one or more advertisements corresponding to a second layer of the two or more layers of advertisements retrieved from a second advertisement database, the first set and the second set of advertisements selected based at least in part on (a) the detected geolocation of the user device and (b) one or more user preferences determined from the second user profile; and transmitting to the user device visible content by the advertising platform server system representative of the final set of advertisements configured for display to a display device user terminal of the user device in accordance with the final sort to thereby enable the first user to interact with the final set of advertisements via the display device.

2. The method of claim 1, wherein the first user profile includes search data from a plurality of prior search requests of the first user, and the search data is obtained from at least two of the plurality of messages.

3. The method of claim 1, sending the final set of advertisements for display on the user device user terminal.

4. The method of claim 1, wherein the data from the first user profile comprises user context and location data, and the two or more layers of advertisements are generated using the user context and location data.

5. The method of claim 1, wherein the respective server is a search engine server, and the first user event data includes search terms submitted by a first user.

6. The method of claim 1, wherein the receiving the plurality of messages comprises receiving the plurality of messages via the listener process software instructions processing at the targeting server system, and the method further comprising queuing at least two of the plurality of messages m a message queue.

7. The method of claim 6, further comprising pulling messages from the message queue, wherein the storing the plurality of user profiles comprises storing information from the messages in the database.

8. The method of claim 6, wherein each of the plurality of messages includes an event corresponding to a user device, and each of the plurality of messages is sent from its respective server by user datagram protocol broadcasting.

9. The method of claim 1, wherein the user device is a mobile device, the request includes a user identifier, and the identifying comprises using the user identifier to identify the first user profile.

10. The method of claim 9, wherein the user identifier is a subscriber identifier corresponding to the mobile device.

11. The method of claim 1, further comprising:

receiving data from a first server, the data corresponding to user information collected by the first server; and updating the plurality of user profiles, including the first user profile, in the database using the data from the first server; and sending a matching user profile to a third-party from the server system based on receiving a user identifier matching a user profile.

12. A non-transitory computer-readable storage medium for tangibly storing thereon computer-readable executable instructions, the instructions when executed causing server systems to:

communicably link over a wide area communications network a user device, a publisher server system, an advertising platform server, an advertiser and a targeting server system;

program and process on the advertiser platform server advertising selection process software instructions, logging process software instructions, sort and rotate process software instructions, scoring algorithm process software instructions and advertising filtering process software instructions;

program and process on the targeting server system listener process software instructions and database process software instructions;

populate an advertisement candidate pool database with candidate advertisements where each candidate advertisement has an associated annotation provided and communicably coupling the advertisement candidate pool database with the advertiser platform server;

process by the listener process software instructions processing at the targeting server system a plurality of messages received by the targeting server system, the plurality of messages including a first message, each message of the plurality of messages being sent from a respective server of a plurality of servers, and the first message including first user event data, where the processing of the listener process software instructions configures the targeting server system to queue at least two of the plurality of messages and pull the messages from the queue and store;

generate geographic location data representative of the user device geographical location with a position identification unit of the user device and provide the geographic location data to the publisher server system and collect from the user device server with the targeting server system the geographic location data, detected by the position identification unit of a user device of the first user;

create and update by listener process software instructions executing on the targeting server system a plurality of user profiles from information in the plurality of messages, the plurality of user profiles each having a user identifier and including:

a first user profile corresponding to a first user and comprising first information from the first user event data; and a second user profile corresponding to the first user and comprising a condensed representative of the first user profile, wherein the second user profile is created based at least in part on a search request received from the user device;

store, by the targeting server system the plurality of user profiles in a targeting database system having a dual architecture, the storing comprising storing the first user profile in a first relational database data store of the dual architecture and storing the second user profile in a second real-time database data store of the dual architecture, wherein the second data store is a key cache for serving the second user profile in real-time;

fulfill by the advertising platform server system an advertisement demand at least in part by:

processing the plurality of messages received by the advertising platform server system processing the listener process software instructions to identify a request corresponding to the user device;

identifying and accessing the second user profile from the second real-time database data store using data from the plurality of messages and the request; and generating, by the sort and rotate process software instructions processing at the advertising platform server system, using data from the second user profile, two or more layers of advertisements from a candidate pool of advertisements, where sorting and ranking is performed by the sort and rotate process based on business rules and user context;

wherein the fulfill of the advertisement demand is independent of accessing the first user profile;

ranking by the scoring algorithm process software instructions processing at the advertising platform server system the two or more layers of advertisements in an order of priority, where the scoring algorithm process is based on one or more of cost and historical performance;

select by the advertiser selection process software instructions and the advertising filtering process software instructions processing at the platform server system a final set of advertisements from the two or more layers of advertisements in accordance with the order of priority and the intermediate sorting process, the final set of advertisements comprising a first set of one or more advertisements corresponding to a first layer of two or more layers of advertisements retrieved from a first advertisement database and a second set of one or more advertisements corresponding to a second layer of two or more layers of advertisements retrieved from the second advertisement database, the first set and the second set of advertisements selected based at least in part on (a) the detected geolocation of the user device and (b) one or more user preferences determined from the second user profile; and transmit to the user device visible content by the advertising platform server system representative of the final set of advertisements configured for display to a display device of the user device in accordance with the final sort to thereby enable the first user to interact with the final set of advertisements via the display device.

13. The storage medium of claim 12, wherein the user device is a mobile device, the request includes a user identifier, the identifying comprises using the user identifier to identify the first user profile, and wherein the instructions further causing the server system to:

display the final set of advertisements on the user device.

14. The storage medium of claim 13, wherein the first user profile includes search data from a plurality of prior search requests of a first user, and the search data is obtained from at least two of the plurality of messages.

15. A data processing system comprising:

a server system comprising memory, a database system storing a plurality of user profiles, and at least one processor coupled to access the memory, the server system configured to:

communicably linking over a wide area communications network a user device, a publisher server system, and advertising platform server, an advertiser and a targeting server system;

programming and processing on the advertiser platform server advertising selection process software instructions, logging process software instructions, sort and rotate process software instructions, scoring process software instructions and advertising filtering process software instructions;

programming and processing on the targeting server system listener process software instructions and database process software instructions;

populating an advertisement candidate pool database with candidate advertisements where each candidate advertisement has an associated annotation provided and communicably coupling the advertisement candidate pool database with the advertiser platform server;

process by the listener process software instructions processing at the targeting server system a plurality of messages received by the targeting server system, the plurality of messages including a first message, each message of the plurality of messages being sent from a respective server of a plurality of servers, and the first message including first user event data, where the listener process configures the targeting server system to queue at least two of the plurality of messages and pull the messages from the queue and store;

generate geographic location data representative of the user device geographical location with a position identification unit of the user device and provide the geographic location data to the publisher server system and collect with the targeting server system the geographic location data, detected by a location device, of a user device of the first user;

create and update by listener process software instructions executing on the targeting server system a plurality of user profiles from information in the plurality of messages, the plurality of user profiles each having a user identifier and including:

a first user profile corresponding to a first user and comprising first information from the first user event data; and a second user profile corresponding to the first user and comprising a condensed representative of the first user profile, wherein the second user profile is created based at least in part on a search request received from the user device;

store, by the targeting server system, the plurality of user profiles in the targeting database system, the database system having a dual architecture, the storing comprising storing the first user profile in a first relational database data store of the dual architecture and storing the second user profile in a second real-time database data store of the dual architecture, wherein the second data store is a key cache for serving the second user profile in real-time;

fulfill by the advertising platform server system an advertisement demand at least in part by:

processing the plurality of messages received by the advertising platform server system processing the listener process software instructions to identify a request corresponding to the user device, where the plurality of messages are received through a common application programming interface supported on the advertising platform server system;

identifying and accessing the second user profile from the second real-time database data store using data from the request; and generating by a sort and rotate process software instructions processing at the advertising platform server system, using data from the second user profile, two or more layers of advertisements from a candidate pool of advertisements, where sorting and ranking is performed by a sort and rotate filtering algorithm based on business rules and user context, wherein the fulfill of the advertisement demand is independent of accessing the first user profile;

rank by the scoring algorithm process software instructions at the advertising platform server system the two or more layers of advertisements in an order of priority, where the scoring algorithm is based on one or more of cost and historical performance;

select by the advertiser selection process software instructions and advertising filtering process software instructions processing at the advertising platform server system a final set of advertisements from the two or more layers of advertisements in accordance with the order of priority and the intermediate sorting process, the final set of advertisements comprising a first set of one or more advertisements corresponding to a first layer of two or more layers of advertisements retrieved from a first advertisement database and a second set of one or more advertisements corresponding to second layer of two or more layers of advertisements retrieved from a second advertisement database, the first set and the second set of advertisements selected based at least in part on (a) the detected geolocation of the user device and (b) one or more user preferences determined from the second user profile; and transmit to the user device visible content by the advertising platform server system representative of the final set of advertisements configured for display to a display device of the user device in accordance with the final sort to thereby enable the first user to interact with the final set of advertisements via the display device.

16. The system of claim 15, wherein each of the plurality of messages includes an event corresponding to a user device, each of the plurality of messages is sent from its respective server by user datagram protocol broadcasting, and the server system is further configured to:

pull messages from the message queue in order to store information obtained from the messages in the database.

17. The system of claim 16, wherein the first user profile includes search data from a plurality of prior search requests of a first user, and the search data is obtained from at least two of the plurality of messages.

* * * * *